US012523640B2

(12) United States Patent
Nishiguchi

(10) Patent No.: US 12,523,640 B2
(45) Date of Patent: Jan. 13, 2026

(54) DISTANCE MEASURING DEVICE AND METHOD FOR MEASURING DISTANCE

(71) Applicant: NIPPON SHOKUBAI CO., LTD., Osaka (JP)

(72) Inventor: Toshiya Nishiguchi, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 780 days.

(21) Appl. No.: 17/597,062

(22) PCT Filed: Jul. 1, 2020

(86) PCT No.: PCT/JP2020/025796
§ 371 (c)(1),
(2) Date: Dec. 23, 2021

(87) PCT Pub. No.: WO2021/006142
PCT Pub. Date: Jan. 14, 2021

(65) Prior Publication Data

US 2022/0236241 A1 Jul. 28, 2022

(30) Foreign Application Priority Data

Jul. 9, 2019 (JP) ................................ 2019-127660

(51) Int. Cl.
*G01N 31/10* (2006.01)
*G01B 5/00* (2006.01)
*G01F 23/292* (2006.01)

(52) U.S. Cl.
CPC ........... *G01N 31/10* (2013.01); *G01B 5/0002* (2013.01); *G01F 23/292* (2013.01)

(58) Field of Classification Search
CPC ..... G01N 31/10; G01F 23/292; G01F 23/284; G01F 23/2962; B01J 2204/002;
(Continued)

(56) References Cited

U.S. PATENT DOCUMENTS 4,896,964 A 1/1990 Kitazume
5,159,760 A * 11/1992 Spiegel .................... G01C 1/02 33/227
(Continued)

FOREIGN PATENT DOCUMENTS

CN 1898525 A 1/2007
JP H09-53918 A 2/1997
(Continued)

OTHER PUBLICATIONS

Korea Intellectual Property Office, "Request for the Submission of an Opinion", which was issued Jan. 22, 2024 in connection with the related Korean patent application No. 10-2021-7040079, with English translation, 9 pages.
(Continued)

*Primary Examiner* — Maris R Kessel
*Assistant Examiner* — Valerie Simmons
(74) *Attorney, Agent, or Firm* — LUCAS & MERCANTI, LLP

(57) ABSTRACT

A distance measuring device includes a measuring member holding a length measuring instrument and at least one rail member (base member) on which the measuring member is movably disposed. When a straight line parallel to a direction in which the measuring member disposed on the base member moves is defined as a reference line, an angle formed by a straight line parallel to an axial length direction of a reaction tube and the reference line, which are on an identical plane, is constant for the plurality of reaction tubes disposed side by side along the reference line. A measurement direction of the length measuring instrument is parallel to the axial length direction of the reaction tube in a state where the measuring member is disposed on the base member. The measuring member is disposed on the base member to be able to sequentially move.

9 Claims, 19 Drawing Sheets

(58) Field of Classification Search
CPC ...... B01J 2208/0061; B01J 2208/00654; B01J 2208/00752; B01J 2208/00769; B01J 2208/021; B01J 2208/024; B01J 2208/027; B01J 4/008; B01J 4/02; B01J 8/06; Y02P 20/52; G01B 5/0004; G01B 5/0009; G01B 11/026; G01B 11/0608; G01B 21/02; G01B 5/0002; G01S 17/88; G01S 7/481; G01S 17/08
See application file for complete search history.

(56) References Cited

U.S. PATENT DOCUMENTS

| | | | | |
|---|---|---|---|---|
| 6,069,271 | A | 5/2000 | Tanimoto et al. | |
| 2005/0138995 | A1 | 6/2005 | Wilhelm | |
| 2007/0280801 | A1* | 12/2007 | Fishburn | E04D 15/00 409/348 |
| 2010/0063304 | A1* | 3/2010 | Olbert | B01J 8/0035 422/600 |
| 2014/0034184 | A1 | 2/2014 | Richter et al. | |

FOREIGN PATENT DOCUMENTS

| | | | |
|---|---|---|---|
| JP | H11-130722 | A | 5/1999 |
| JP | 2003-097934 | A | 4/2003 |
| JP | 2003-340267 | A | 12/2003 |
| JP | 2009-148730 | A | 7/2009 |
| JP | 2012-239943 | A | 12/2012 |
| KR | 1997-0006783 | U | 2/1997 |

OTHER PUBLICATIONS

PCT, International Search Report for the corresponding patent application No. PCT/JP2020/025796, dated Oct. 6, 2020, with English translation.
Extended European Search Report dated Aug. 5, 2022 for the corresponding patent application No. 20836015.6.
Office Action dated Nov. 1, 2024, issued for the corresponding Chinese patent application No. 202080049691.8, 16 pages, with English machine translation.

* cited by examiner (A)

(B)

(A)

(B)

(A)

(B)

(A)

(B)

(A)

(B)

(A)

(B)

DISTANCE MEASURING DEVICE AND METHOD FOR MEASURING DISTANCE

CROSS REFERENCE TO RELATED APPLICATION

This Application is a 371 of PCT/JP2020/025796 filed on Jul. 1, 2020 which, in turn, claimed the priority of Japanese Patent Application No. 2019-127660 filed on Jul. 9, 2019, and both applications are incorporated herein by reference.

TECHNICAL FIELD

The present invention relates to a distance measuring device and a method for measuring a distance.

BACKGROUND ART

In the field of the petrochemical industry, many catalytic reactions such as a decomposition reaction, a reforming reaction, an oxidation reaction, an ammoxidation reaction, and a reduction reaction of hydrocarbons, using a reactor with multiple tubes, are performed. A reactor used for these reactions is provided with a few thousands to several tens of thousands of reaction tubes, and a reaction tube is filled with a solid in a granular shape such as a catalyst and an inert substance suitable for each catalytic reaction (hereinafter, a granular solid such as a catalyst filled in a reaction tube may be simply referred to as a "solid" or a "filling"). For example, Patent Literature 1 discloses a method in which a layer filled with an inert substance is provided between a layer filled with a pre-stage reaction catalyst and a layer filled with a post-stage reaction catalyst, and acrylic acid is produced from propylene by a two-stage catalytic gas-phase oxidation reaction using one heat-exchange type reactor with multiple tubes.

To perform reaction in a preferable state using a reactor with multiple tubes as described above, it is important to keep a filling height of a filling within a predetermined control range. When a filling height of a catalyst is not constant for each of reaction tubes, reaction varies for each of the reaction tubes. This may cause a decrease in a reaction rate or a decrease in a yield as a whole, or may cause runaway of reaction in some of the reaction tubes. For example, Patent Literature 2 discloses a method for filling a catalyst in which each reaction tube is filled with a catalyst such that a difference between a filling height of each reaction tube and an average value of the filling heights is within ±20% of the average value of the filling heights. Thus, during catalyst filling operation, operation of measuring a filling height of an object filled in each reaction tube is usually performed.

Measurement of a filling height of a filling is performed by measuring a distance (hereinafter, also referred to as a "space length") from an opening of a reaction tube to the filling.

CITATION LIST

Patent Literatures

Patent Literature 1: JP 11-130722 A
Patent Literature 2: JP 2003-340267 A

SUMMARY OF INVENTION

Technical Problem

In general, a reactor with multiple tubes has a structure in which an upper end portion of a reaction tube of the reactor with multiple tubes is inserted into a hole of a perforated plate, and a connection portion between the perforated plate and the reaction tube is welded and joined. The perforated plate to which the reaction tube is joined is referred to as a tube sheet, and a surface of the tube sheet is referred to as a tube sheet surface. A surface of the perforated plate itself before welding and joining the reaction tube is smooth. However, the tube sheet surface after the reaction tube is welded and joined is uneven due to welding marks such as weld beads and spatter, and thus causing a non-smooth portion.

When the space length is measured from above an upper tube sheet of a reactor using, for example, a laser distance meter attached to a normal tripod as a length measuring instrument, one or more legs of the tripod may be placed on a welding mark or may come immediately above an opening of a reaction tube. For this reason, when the space length is measured for a plurality of reaction tubes, a measurement direction of the laser distance meter cannot be always parallel to an axial length direction of the reaction tubes. This causes a problem in that even when the space length can be measured for any one of the reaction tubes, measurement may not be performed for the other reaction tubes, and thus the measurement direction needs to be adjusted each time.

The inventor has found that when a base member such as a rail is installed on a tube sheet and a measuring member such as a tripod to which a length measuring instrument such as a laser distance meter is attached is disposed on the base member, the space length can be stably measured for any reaction tube without being affected by unevenness due to a welding mark. The inventor has also found that space lengths of a plurality of reaction tubes can be continuously measured by sliding the tripod along the rail in this method.

As described above, the inventor has found out that the space length can be stably and quickly measured in a non-contact manner by allowing a measuring member holding the length measuring instrument to be movable on the base member, and thus have made the present invention.

Thus, an object of the present invention is to provide a distance measuring device and a method for measuring a distance, being capable of simply and quickly measuring a distance from an opening of a reaction tube to a solid in a granular shape filled in the reaction tube.

Solution to Problem

A distance measuring device according to an aspect of the present invention measures, in a reactor in which a plurality of reaction tubes arranged parallel to each other is joined to a tube sheet, a distance from an opening formed at an end of a reaction tube in an axial length direction to a solid in a granular shape of a catalyst and/or an inert substance filled in the reaction tube in a non-contact manner for at least some of the plurality of reaction tubes. The distance measuring device includes a measuring member holding a length measuring instrument, and at least one base member on which the measuring member is movably disposed. When a straight line parallel to a direction in which the measuring member disposed on the base member moves is defined as a reference line, an angle formed by a straight line parallel to an axial length direction of the reaction tube and the reference line, which are on an identical plane, is constant for the plurality of reaction tubes disposed side by side along the reference line. A measurement direction of the length measuring instrument is parallel to the axial length direction of the reaction tube when the measuring member is disposed on the base member. The measuring member is disposed on the base member to be able to sequentially move from a position where the distance of one of the reaction tubes is measured to a position where the distance of another of the reaction tubes is to be measured.

A method for measuring a distance according to another aspect of the present invention is configured for a reactor in which a plurality of reaction tubes arranged parallel to each other is joined to a tube sheet, and the method includes the step of measuring a distance from an opening formed at an end of a reaction tube in an axial length direction to a solid in a granular shape of a catalyst and/or an inert substance filled in the reaction tube in a non-contact manner for at least some of the plurality of reaction tubes. In this method for measuring a distance, a measuring member holding a length measuring instrument is movably disposed on a base member, a straight line parallel to a direction in which the measuring member disposed on the base member moves is defined as a reference line, an angle formed by a straight line parallel to the axial length direction of the reaction tube and the reference line, which are on an identical plane, is constant for the plurality of reaction tubes disposed side by side along the reference line, a measurement direction of the length measuring instrument is parallel to the axial length direction of the reaction tube in a state where the measuring member is disposed on the base member, and the distance is sequentially measured by sequentially moving the measuring member from a position where the distance of one of the reaction tubes is measured to a position where the distance of another of the reaction tubes is to be measured.

Advantageous Effect of the Invention

According to the present invention, it is unnecessary to repeat adjustment work of allowing a measurement direction measured by the length measuring instrument to be parallel to the axial length direction of a reaction tube, and a distance from the opening of the reaction tube to the solid in a granular shape filled in the reaction tube can be simply and quickly measured in a non-contact manner for the plurality of reaction tubes by sequentially moving the measuring member along the base member. Thus, a construction period at work of filling or replacing a filling can be shortened, so that cost associated with the work can be reduced, and thus this can also contribute to improvement of a plant operation rate.

To allow the reactor to perform reaction in a preferable state, it is important to keep a filling height of the filling within a predetermined control range without damaging the filling in the reaction tube. According to the present invention, the distance can be quickly measured without damaging a filling such as a fragile catalyst, so that the filling height of the filling can be quickly kept within a predetermined control range, and thus the reaction can be stably performed for a long period of time.

DESCRIPTION OF EMBODIMENTS

Figure 1:
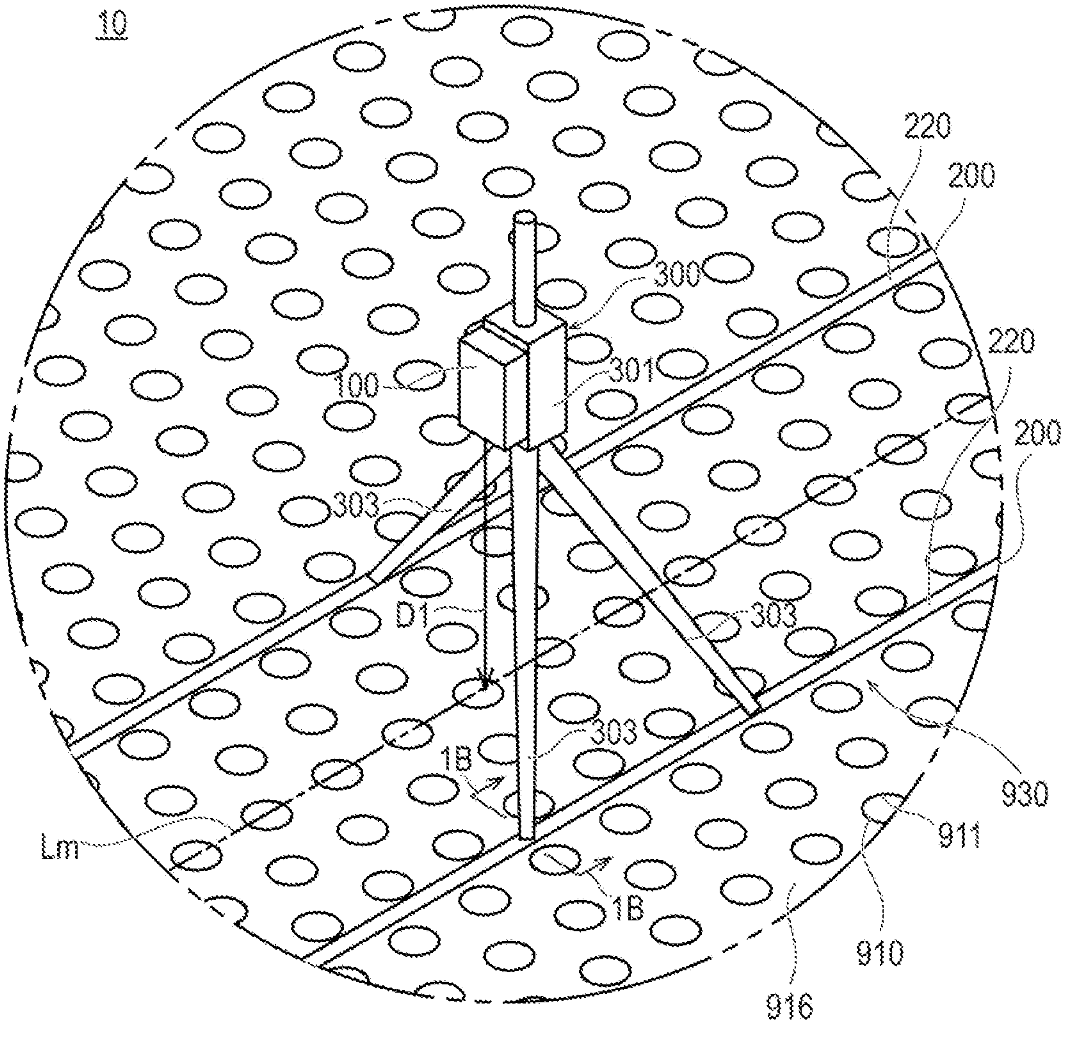
FIG. 1 shows (A) a perspective view schematically illustrating a distance measuring device of a first embodiment, and (B) a sectional view taken along line 1B-1B in (A) of FIG. 1.
Figure 1:
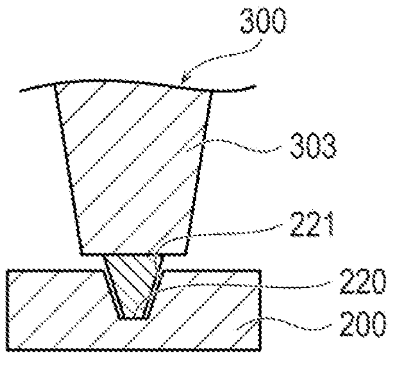

The distance measuring device of the present invention, in a reactor in which a plurality of reaction tubes arranged parallel to each other is joined to a tube sheet, can measure a distance from an opening formed at an end of a reaction tube in an axial length direction to a solid in a granular shape of a catalyst and/or an inert substance filled in the reaction tube in a non-contact manner. Measurement of a distance can be performed only for some of the reaction tubes contained in the reactor or for all the reaction tubes contained in the reactor. That is, the measurement of a distance can be performed for at least some of the plurality of reaction tubes. The distance measuring device includes a measuring member holding a length measuring instrument, and at least one base member on which the measuring member is movably disposed. When a straight line parallel to a direction in which the measuring member disposed on the base member moves is defined as a reference line, an angle formed by a straight line parallel to an axial length direction of the reaction tube and the reference line, which are on an identical plane, is constant for the plurality of reaction tubes disposed side by side along the reference line. A measurement direction of the length measuring instrument is parallel to the axial length direction of the reaction tube when the measuring member is disposed on the base member. The measuring member is disposed on the base member to be able to sequentially move from a position where the distance of one of the reaction tubes is measured to a position where the distance of another of the reaction tubes is to be measured. In the present specification, the "base member" is defined as a member capable of movably disposing the measuring member, and a specific structure is not limited as long as the measuring member can be moved. The "measuring member" is defined as including the length measuring instrument and further including a member used for disposing the measuring member on the base member. In the present specification, the "straight line parallel to a direction in which the measuring member disposed on the base member moves" means a straight line parallel to a direction (vector) in which the measuring member moves on a projection surface when the tube sheet is viewed in plan from above. When two planes perpendicular to the projection surface of the tube sheet in plan view from above are defined as projection surfaces, the "straight line parallel to an axial length direction of the reaction tube" means a straight line parallel to an axial length direction (vector) of the reaction tube on any of the two projection surfaces.

The measuring member disposed on the base member is capable of slidably moving. The base member has, for example, a rail shape or a plate shape. In the present specification, "slide movement" means that the measuring member smoothly moves along the reference line in a state where the measuring member is disposed on the base member, and includes a mode in which the measuring member moves by rotation of a bearing, a roller, or the like provided in the measuring member or the base member.

Naturally, the base member is not parallel to the axial length direction of the reaction tube, and is oriented in a direction intersecting the axial length direction of the reaction tube. The distance measuring device can further include a support leg that supports the base member and allows the base member to be detachably attached above the tube sheet. The base member can be disposed above the tube sheet using the support leg. Any one of a support leg with a fixed height (length) and a support leg with an adjustable height (length) can be used. The height (length) of the support leg can define a height of the base member from the tube sheet. The base member can be attached to a reaction tube using the support leg inserted into an opening of the reaction tube.

As defined above, the "measuring member" includes a member used for disposing the measuring member on the base member. The member used for disposing the measuring member on the base member can be variously changed. For example, the measuring member can include three or more leg members disposed on the base member, and a plate member disposed on the base member or a slider disposed on the base member. Additionally, the measuring member is not limited to a mode in which the measuring member is manually moved, and can include a wheeled platform that is disposed on the base member and is capable of autonomously traveling.

In the present specification, the phrase, "dispose", means "placing a predetermined member in contact with another member". For example, "a measuring member disposed on the base member" means "a measuring member that can be placed so as to be in contact with the base member", "a state where the measuring member is disposed on the base member" means "a state where the measuring member is placed in contact with the base member", and "the base member is disposed on the tube sheet" means "the base member can be placed on the tube sheet so as to be in contact with the tube sheet". The phrase, "contact", means that "a predetermined member is actually in contact with another member".

Hereinafter, embodiments and various modifications of the present invention will be described with reference to the accompanying drawings. The following description does not limit the technical scope or meaning of the terms described in the scope of claims. For convenience of description, dimensional ratios in the drawings are exaggerated, and may be different from actual ratios. The present specification describes a range "X to Y" that means "X or more and Y or less".

<Distance Measuring Device 10 (First Embodiment)>

First, a distance measuring device 10 according to a first embodiment will be described.

Figure 2:
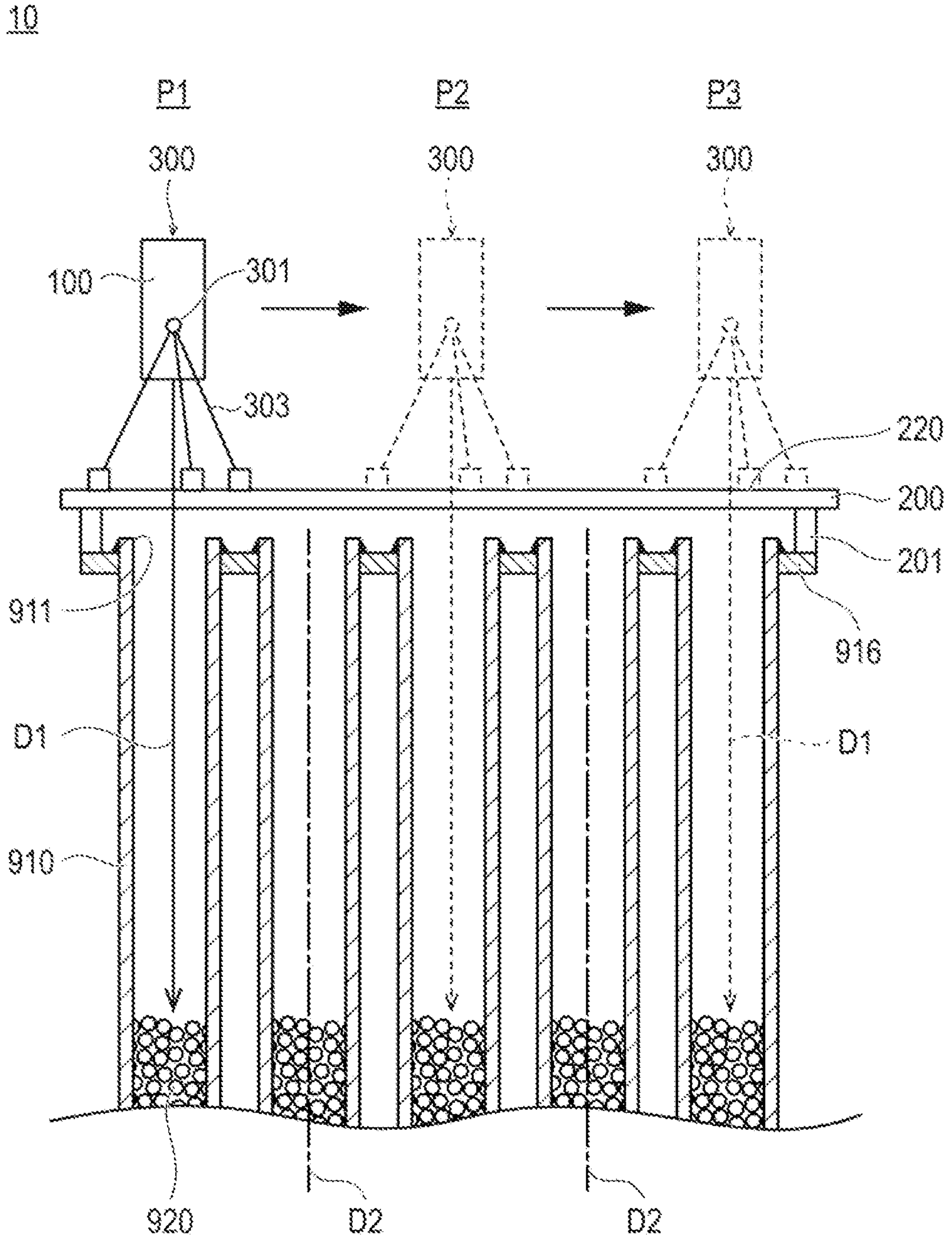
FIG. 2 is a view schematically illustrating a state where a distance from an opening formed at an end of a reaction tube in an axial length direction to a solid in a granular shape of a catalyst filled in the reaction tube is and/or an inert substance sequentially measured in a non-contact manner by a distance measuring device.
Figure 3A:
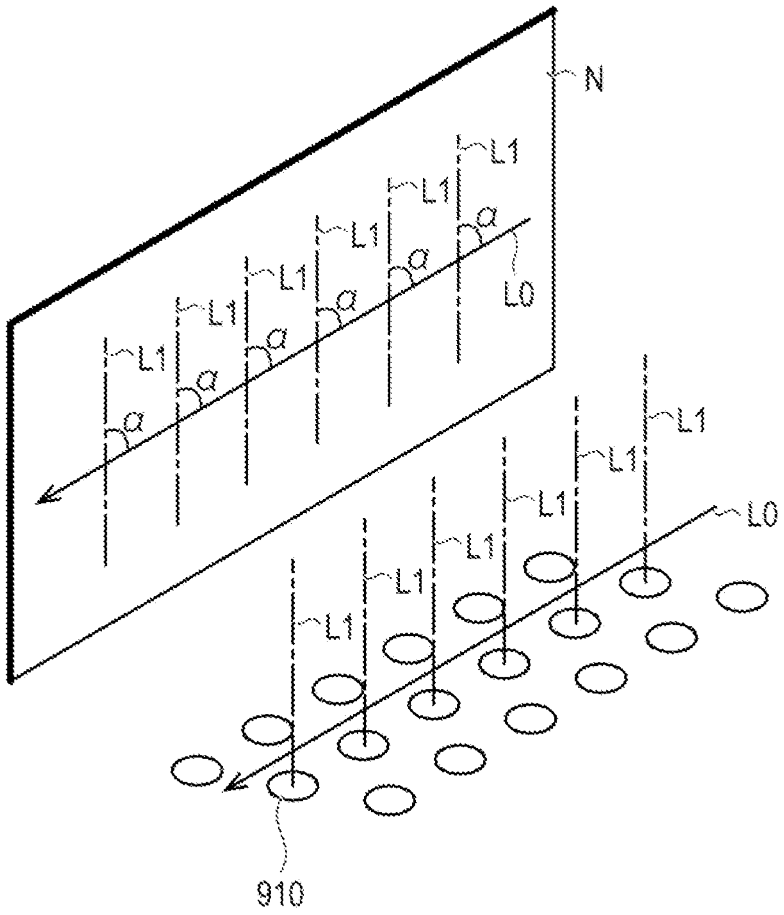
FIG. 3A is a schematic view for illustrating an angle formed by a straight line parallel to an axial length direction of a reaction tube and a reference line, which are on an identical plane, when a straight line parallel to a direction in which a measuring member disposed on a base member moves is defined as the reference line.
Figure 3B:
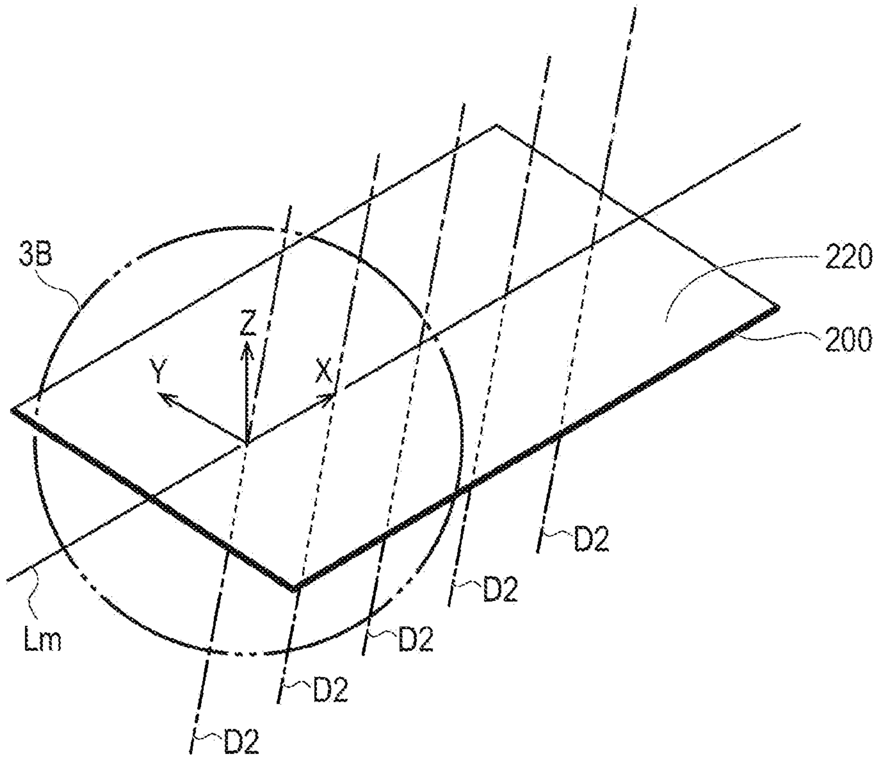
FIG. 3B shows (A) a perspective view illustrating a relationship between a contact surface of a base member and an axial length direction of a reaction tube, and (B) an enlarged perspective view illustrating a portion 3B surrounded by a two-dot chain line in (A) of FIG. 3B.
Figure 3B:
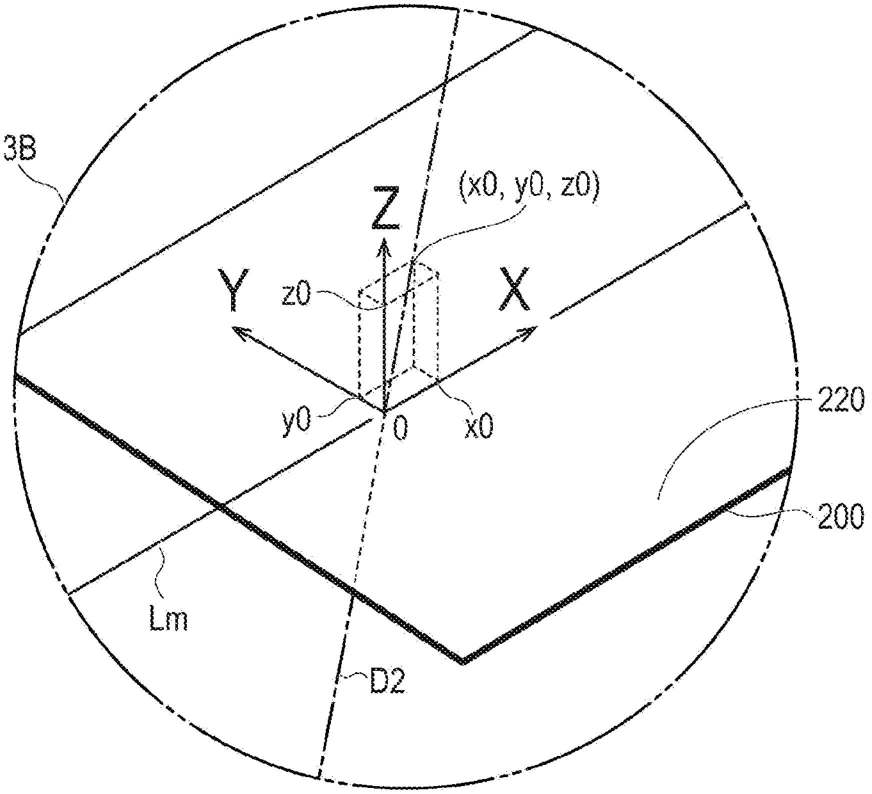
Figure 3C:
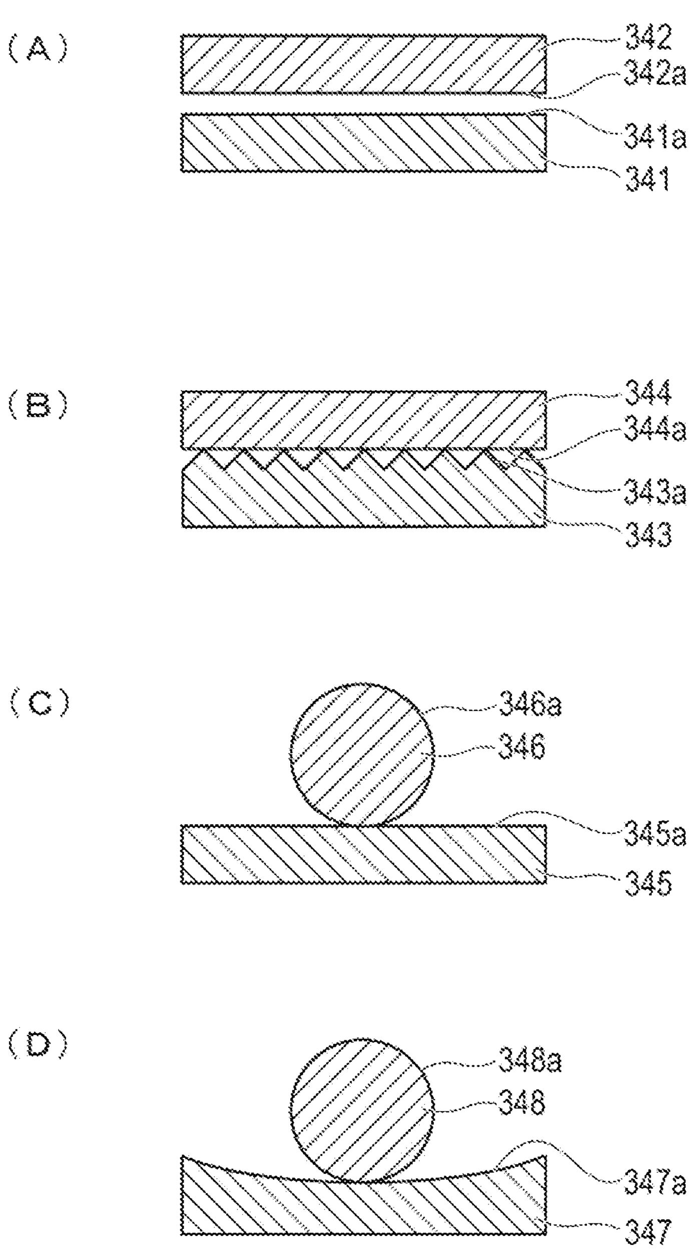
FIG. 3C shows sectional views (A), (B), (C), and (D) schematically illustrating various modes in which a base member and a measuring member are in contact with each other.
Figure 4:
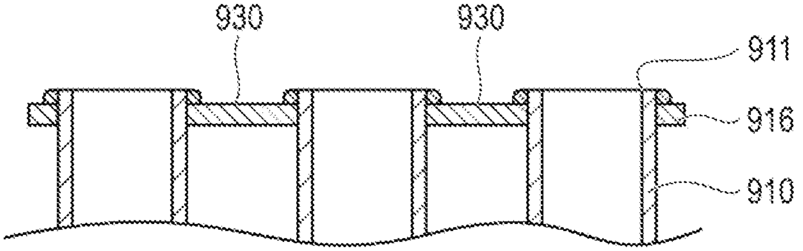
FIG. 4 shows (A) a sectional view illustrating a tube sheet to which a plurality of reaction tubes is joined, and (B) a top view of (A) of FIG. 4 illustrating the tube sheet.
Figure 4:
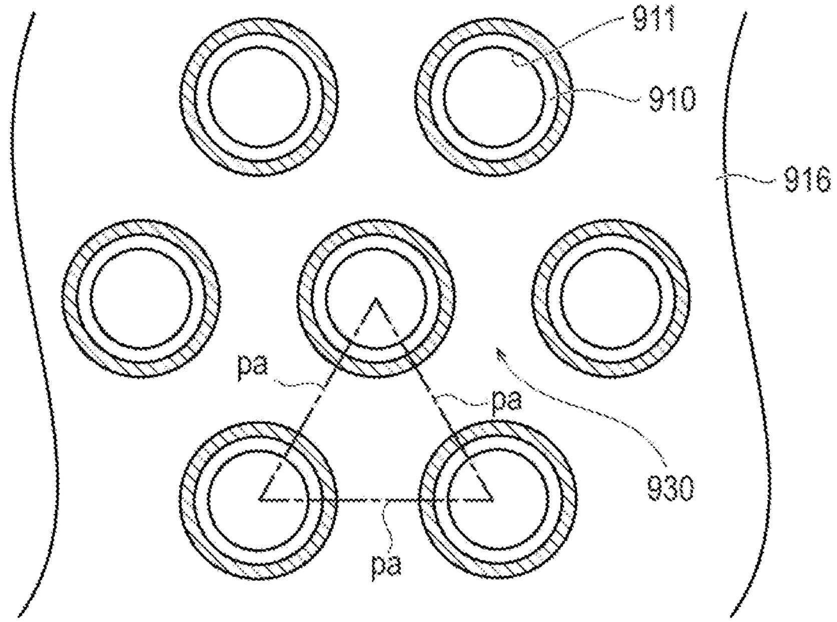
Figure 5:
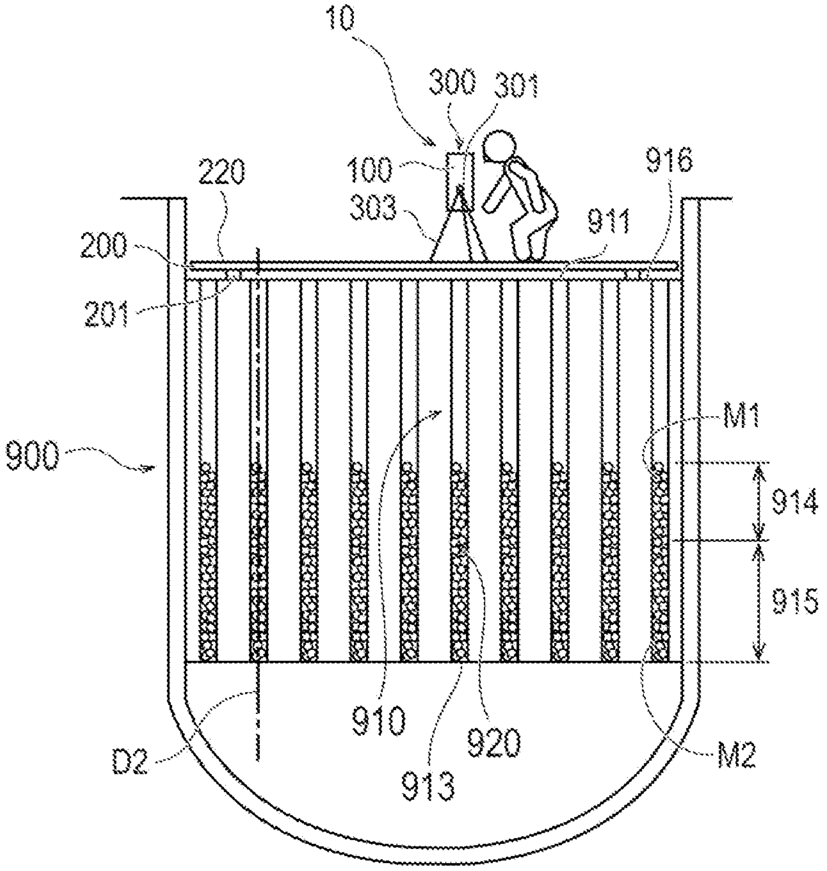
FIG. 5 is a view schematically illustrating a reactor including a plurality of reaction tubes and schematically illustrating a state where a distance from an opening of a reaction tube to a solid is measured.

FIG. 1(A) is a perspective view schematically illustrating the distance measuring device 10 of the first embodiment, and FIG. 1(B) is a sectional view taken along line 1B-1B of FIG. 1(A). FIG. 2 is a view schematically illustrating a state where a distance from an opening 911 formed at an end of a reaction tube 910 in an axial length direction D2 to a solid 920 in a granular shape of a catalyst and/or an inert substance filled in the reaction tube 910 is sequentially measured in a non-contact manner by the distance measuring device 10. FIG. 3A is a schematic view for illustrating an angle α formed by a straight line L1 parallel to the axial length direction of the reaction tube 910 and a reference line L0, which are on an identical plane N, when a straight line parallel to a direction in which a measuring member disposed on a base member moves is defined as the reference line L0. FIG. 3B(A) is a perspective view illustrating a relationship between a contact surface 220 of a base member 200 and the axial length direction D2 of the reaction tube 910, and FIG. 3B(B) is an enlarged perspective view illustrating a portion 3B surrounded by a two-dot chain line in FIG. 3B(A). FIGS. 3C(A), 3C(B), 3C(C), and 3C(D) are sectional views schematically illustrating various modes in which a base member and a measuring member are in contact with each other. FIG. 4(A) is a sectional view illustrating a tube sheet 916 to which a plurality of reaction tubes 910 is joined, and FIG. 4(B) is a top view illustrating the tube sheet 916. FIG. 5 is a view schematically illustrating a reactor 900 including the plurality of reaction tubes 910 and schematically illustrating a state where a distance from the opening 911 of the reaction tube 910 to the solid 920 is measured. FIG. 1(A) shows a straight line Lm indicated by a two-dot chain line that indicates a row of the reaction tubes 910 for which a measuring member 300 is sequentially moved to measure the space length. FIG. 2 shows reference numerals P1, P2, and P3 that schematically indicate positions at each of which the space length is measured by a length measuring instrument 100. The axial length direction D2 of the reaction tube 910 is a vertical direction in FIGS. 2 and 5.

With reference to FIGS. 1(A), 2, and 5, the distance measuring device 10 is generally used for the reactor 900 in which the plurality of reaction tubes 910 arranged parallel to each other is joined to the tube sheet 916, and used for measuring a distance from the opening 911 formed at an end of a reaction tube 910 in the axial length direction D2 to the solid 920 in a granular shape of a catalyst and/or an inert substance filled in the reaction tube 910 in a non-contact manner for at least some of the plurality of reaction tubes 910. The distance measuring device 10 can include the measuring member 300 holding the length measuring instrument 100 and at least one rail member 200 (corresponding to a base member) on which the measuring member 300 is movably disposed. When a straight line parallel to a direction in which the measuring member 300 disposed above the rail member 200 moves is defined as the reference line L0 as illustrated in FIG. 3A, the angle α formed by the straight line L1 parallel to the axial length direction D2 of the reaction tube 910 and the reference line L0, which are on the identical plane N, is constant for the plurality of reaction tubes 910 disposed side by side along the reference line L0. As illustrated in FIG. 2, a measurement direction D1 of the length measuring instrument 100 is parallel to the axial length direction D2 of the reaction tube 910 in a state where the measuring member 300 is disposed above the rail member 200. Then, the measuring member 300 can be disposed above the rail member 200 to be able to sequentially move from the position P1 (P2) where a distance of one reaction tube 910 is measured to the position P2 (P3) where the distance of another reaction tube 910 is to be measured.

As illustrated in FIGS. 2, 4(A), 4(B), and 5, the reactor 900 includes the plurality of reaction tubes 910 arranged parallel to each other. The plurality of reaction tubes 910 in the reactor 900 is usually arranged in the form of a triangular complex array, a quadrangular series, a quadrangular complex array, or the like so that distances between the corresponding adjacent reaction tubes are as equal as possible. For example, when the plurality of reaction tubes 910 is arranged in a triangular complex array, the plurality of reaction tubes 910 is arranged at a predetermined pitch pa (see FIG. 4(B)). Upper ends of the plurality of reaction tubes 910 are joined to the tube sheet 916 by welding. A tube sheet surface is uneven due to welding marks such as weld beads and spatter, and thus causing a non-smooth portion. Then, the welding marks are concentrated on an outer peripheral portion of each of the reaction tubes 910. Thus, there is no welding mark in an intermediate portion between one reaction tube 910 and another reaction tube 910 adjacent to the one reaction tube 910, so that the tube sheet 916 can have a smooth surface 930. An angle between the smooth surface 930 of the tube sheet 916 and the axial length direction D2 of the reaction tube 910 is constant, and usually, the axial length direction D2 of the reaction tube 910 is perpendicular to the smooth surface 930 of the tube sheet 916.

As illustrated in FIGS. 1(A) and 2, the measuring member 300 can be disposed above the contact surface 220 of the rail member 200. The contact surface 220 of the rail member 200 can be a smooth continuous plane. In this case, the measuring member 300 is capable of slidably moving while being disposed on the contact surface 220 and maintaining a state where the measurement direction D1 of the length measuring instrument 100 is parallel to the axial length direction D2 of the reaction tube 910. The distance measuring device 10 can include a plurality of rail members 200. When the tube sheet 916 is viewed in plan from above, a plurality of (e.g., two) rail members 200 can be arranged parallel to each other.

As illustrated in FIG. 1(B), the rail member 200 can be formed of a member having a rail shape in section. A leg member 303, which will be described later, of the measuring member 300 can have a pointed (spike-like) tip. The rail member 200 can include a guide groove 221 that guides the tip of the leg member 303 while preventing the tip from coming off.

The distance measuring device 10 can further include a support leg 201 that supports the rail member 200 and allow the rail member 200 to be detachably attached above the tube sheet 916. The support leg 201 can be attached to a lower surface of the rail member 200. The rail member 200 can be disposed above the smooth surface 930 of the tube sheet 916 using the support leg 201. The support leg 201 is not necessarily disposed on the smooth surface 930 of the tube sheet 916 as long as the rail member 200 is disposed stably without wobbling. After being adjusted for an attachment position, the rail member 200 can be fixed to an outer peripheral wall of the reactor 900, the reaction tube 910, and the like using a clamp jig (not illustrated) or the like. The support leg is not limited in shape and structure as long as the rail member 200 can be supported and the rail member 200 can be detachably attached above the tube sheet 916. For example, the support leg can be formed in an elongated rod shape, a hollow pipe shape, or a plate shape.

A straight line L0 illustrated in FIG. 3A indicates a straight line parallel to the direction in which the measuring member disposed on the base member moves. This straight line is referred to as a “reference line L0”. The straight line L1 indicates a straight line parallel to the axial length direction of the reaction tube 910. The reaction tubes 910 are parallel to each other. Thus, the angle α formed by the straight line L1 and the reference line L0, which are on the identical plane N, is constant for the plurality of reaction tubes 910 aligned along the reference line L0. When the tube sheet 916 is viewed in plan from above, the reference line L0 is parallel to a straight line Lm (a row of the reaction tubes 910 for each of which the space length is measured by sequentially moving the measuring member 300) indicated in FIGS. 1(A) and 3B(A). Here, the plurality of reaction tubes 910 is aligned along the straight line Lm, so that the plurality of reaction tubes is also referred to as “the plurality of reaction tubes 910 aligned along the reference line L0” for convenience in the present specification.

FIGS. 3B(A) and 3B(B) each show an X axis and a Y axis that indicate two straight lines on the contact surface 220 of the rail member 200, and the X axis and the Y axis are orthogonal to each other. A Z axis indicates a straight line perpendicular to the two straight lines of the X axis and the Y axis, and is perpendicular to the contact surface 220. FIG. 3B(B) shows an origin of XYZ coordinates that coincides with a point at which the axial length direction D2 of the reaction tube 910 passes through the contact surface 220. The straight line Lm indicates a row of the reaction tubes 910 for each of which the space length is measured by sequentially moving the measuring member 300. As illustrated, when the rail member 200 is attached to the reactor 900, the axial length direction D2 of the reaction tube 910 may not necessarily be perpendicular to the contact surface 220 of the rail member 200. FIG. 3B(B) illustrates a state where the axial length direction D2 of the reaction tube 910 is inclined to pass through a point (x0, y0, z0) of the XYZ coordinates without passing along the Z axis. As described above, the angle α formed by the straight line L1 parallel to the axial length direction D2 of the reaction tube 910 and the reference line L0, which are on the identical plane N, is constant for the plurality of reaction tubes 910 aligned along the reference line L0. For this reason, every axial length direction D2 passing through the contact surface 220 is inclined in the same manner. Even when the axial length direction D2 of the reaction tube 910 is not perpendicular to the contact surface 220 of the rail member 200, a distance (space length) from the opening 911 of the reaction tube 910 to the solid 920 can be measured by allowing the measurement direction D1 of the length measuring instrument 100 to be parallel to the axial length direction D2 of the reaction tube 910 in a state where the measuring member 300 is disposed above the rail member 200.

Various modes in which the base member and the measuring member are in contact with each other will be described. A shape (structure) in which the base member and the measuring member are in contact with each other may be any shape (structure) as long as the measuring member can be slid straight when the measuring member is disposed on the base member. For example, as illustrated in FIG. 3C(A), when a contact surface 341*a* of the base member 341 is formed into a smooth continuous plane and a contact surface 342*a* of the measuring member 342 is formed into a smooth continuous plane, the base member 341 and the measuring member 342 can be brought into contact with each other in a "plane". As illustrated in FIG. 3C(B), when a contact surface 343*a* of the base member 343 is formed into an uneven surface protruding in a triangular shape and a contact surface 344*a* of the measuring member 344 is formed into a smooth continuous plane, the base member 343 and the measuring member 344 can be brought into contact with each other on a "line". In FIG. 3C(B), a direction in which the measuring member 344 slidably moves is a direction orthogonal to the paper surface. As illustrated in FIG. 3C(C), when a contact surface 345*a* of the base member 345 is formed into a smooth continuous plane and a contact surface 346*a* of the measuring member 346 is formed into a spherical surface as in a bearing or the like, the base member 345 and the measuring member 346 can be brought into contact with each other at a "point". As illustrated in FIG. 3C(D), when a contact surface 347*a* of the base member 347 is formed into a curved surface and a contact surface 348*a* of the measuring member 348 is formed into a spherical surface as in a bearing or the like, the base member 347 and the measuring member 348 can be brought into contact with each other at a "point". In FIG. 3C(D), the contact surface 347*a* of the base member 347 can be formed into a shape like an inner surface obtained by cutting a pipe, the shape having a smooth straight line in a direction in which the measuring member 348 slidably moves (direction orthogonal to the paper surface), and a curved surface protruding downward in a direction orthogonal to the direction in which the measuring member 348 slidably moves (direction of the paper surface). As is apparent from the above description, even when the contact surface of the base member is not a smooth continuous plane, the measuring member is capable of slidably moving while being disposed on the base member.

A type of the length measuring instrument 100 is not limited as long as a distance is measured in a non-contact manner. As the length measuring instrument 100, for example, a known instrument that measures a distance in a non-contact manner using a laser, a sound wave, or a microwave can be used, and a laser-type length measuring instrument is particularly preferable.

Although principles of the laser-type length measuring instrument are roughly classified into a triangulation type, a time-of-flight type, and a phase difference type, the principles are not particularly limited. Although a type of laser is not particularly limited, a laser having a wavelength of 635 nm is generally used. As a model of the laser-type length measuring instrument, for example, handy-type models, such as a laser distance meter (model number GLM 50C, model number GLM 150C, and the like) available from Bosch Co., Ltd., and a laser distance meter (Leica DISTO (registered trademark) D1, Leica DISTO (registered trademark) D810, Leica DISTO (registered trademark) X3, and the like) available from Leica Geosystems Co., Ltd., are sold. A laser-type length measuring instrument with an inclination measuring function for displaying an inclination of a main body is also sold, and is preferable because it can be used as an index when an irradiation direction is calibrated. Besides the handy-type models, a module type model such as a laser-type distance sensor (LDS-7A or the like) available from TAKENAKA ELECTRONICS CO., LTD., which is used by being incorporated in a PC or a device, is also sold, and any of these length measuring instruments can be applied to the present invention.

As illustrated in FIGS. 1(A) and 1(B), the measuring member 300 can include an adaptor 301 that holds the length measuring instrument 100, and three or more (three in the drawings) leg members 303 to be disposed on the contact surface 220 of the rail member 200. The three leg members 303 can be formed using a tripod, for example. Each of the leg members 303 has a stretchable structure and can be adjusted in length. The measuring member 300 enables all tips of the leg members 303 to be disposed on the contact surface 220. Two of the three leg members 303 can be disposed on the contact surface 220 of one rail member 200 of the two rail members arranged parallel to each other, and the remaining one can be disposed on the contact surface 220 of the other rail member 200. The measuring member 300 may have four or more leg members 303 to be disposed on the contact surface 220 of the rail member 200. The four leg members 303 can be formed using a tetrapod, for example.

The adaptor 301 can have an adjustment mechanism (not illustrated) that adjusts an orientation of the measurement direction D1 of the length measuring instrument 100. The adjustment mechanism includes a ball head, a plurality of thumbscrew type fixtures, and the like, and can freely adjust the measurement direction D1 of the length measuring instrument 100. The measurement direction D1 of the length measuring instrument 100 is parallel to the axial length direction D2 of the reaction tube 910 in a state where all the leg members 303 are in contact with the contact surface 220 (state where the measuring member 300 is disposed above the contact surface 220).

Adjustment of the measurement direction D1 of the length measuring instrument 100 is performed, for example, as follows. First, the measuring member 300 is disposed above the contact surface 220 of the rail member 200 such that all the tips of the leg members 303 of the measuring member 300 are brought into contact with the contact surface 220. First, from a row of the reaction tubes 910 for which measuring member 300 is slidably moved to measure space length (straight line Lm in FIG. 1(A)), the space length of any one of the reaction tubes 910 is measured with a measure or the like. Next, a fixing screw of the ball head is loosened to adjust a laser irradiation direction and an angle of the length measuring instrument 100 so that the space length is measured. After the adjustment, the fixing screw of the ball head is tightened to fix the length measuring instrument 100. When a distance to a tube wall is measured, a short distance is displayed, and thus the angle of the length measuring instrument 100 is readjusted. As a guideline of the adjustment, when the laser distance meter has a measurement value within a range of ±1% of the space length measured by the measure or the like, it can be determined that the adjustment is performed at an appropriate angle.

A distance actually measured by the length measuring instrument 100 is a distance from a tip of the length measuring instrument 100 to the solid 920. As illustrated in FIG. 1(A), the tip of the length measuring instrument 100 may be located above an upper end of the reaction tube 910 (on a horizontal plane of the opening 911) at the time of measurement depending on a specific structure and shape of the length measuring instrument 100 and the measuring member 300, so that an offset operation of a length measurement result may be required. In such a case, an offset dimension between the tip of the length measuring instrument 100 and the upper end of the reaction tube 910 can be measured in advance and stored in the length measuring instrument 100 as correction data. At the time of measurement, a distance actually measured by the length measuring instrument 100 can be corrected based on the offset dimension. This enables the distance from the opening 911 of the reaction tube 910 to the solid 920 to be measured.

As described above, the angle α formed by the straight line L1 parallel to the axial length direction D2 of the reaction tube 910 and the reference line L0, which are on the identical plane N, is constant for the plurality of reaction tubes 910 aligned along the reference line L0 (see FIG. 3A). Additionally, the measurement direction D1 of the length measuring instrument 100 is parallel to the axial length direction D2 of the reaction tube 910 in a state where the measuring member 300 is disposed above the rail member 200. Thus, even when the measuring member 300 is slidably moved along the contact surface 220 of the rail member 200, the measurement direction D1 of the length measuring instrument 100 is parallel to the axial length direction D2 of any reaction tube 910 for which the space length is to be measured. Then, to measure the space length of a different reaction tube, the plurality of reaction tubes 910 can be measured for the space length without adjusting the angle of the length measuring instrument 100.

When an attachment position of the rail member 200 is changed, angle adjustment of the length measuring instrument 100 described above needs to be performed again. However, the smooth surface 930 of the tube sheet 916 on which the rail member 200 is placed usually has a constant angle formed with the axial length direction D2 of the reaction tube 910 in many cases, so that fine adjustment is often sufficient for adjustment work of the length measuring instrument 100 in the measurement direction D1.

The angle adjustment of the length measuring instrument 100 causes the measurement direction D1 of the length measuring instrument 100 to orient the axial length direction D2. Here, the "orient" means that the measurement direction D1 for measurement using the length measuring instrument 100, i.e., an irradiation direction of an irradiation wave for distance measurement (e.g., a laser beam of the laser-type length measuring instrument 100 or the like) is directed downward and substantially parallel to the axial length direction D2.

In the present specification, "the measurement direction D1 of the length measuring instrument 100 is parallel to the axial length direction D2 of the reaction tube 910" is to be understood to include not only a case of being strictly parallel, but also a case where the measurement direction D1 of the length measuring instrument 100 is slightly deviated from the axial length direction D2 of the reaction tube 910 within a range in which a distance from the opening 911 to the solid 920 can be measured.

As illustrated in FIG. 2, first, the measuring member 300 is slidably moved to the position P1, and the length measuring instrument 100 can measure a distance (space length) from the opening 911 of the reaction tube 910 to the solid 920 at the position P1. The measuring member 300 is then slidably moved from the position P1 to the position P2, and the length measuring instrument 100 can measure the distance from the opening 911 of the reaction tube 910 to the solid 920 at the position P2. After that, the measuring member 300 is slidably moved from the position P2 to a position P3, and the length measuring instrument 100 can measure the distance from the opening 911 of the reaction tube 910 to the solid 920 at the position P3. As described above, the measuring member 300 can be disposed above the contact surface 220 of the rail member 200 to be capable of sequentially slidably moving from the position P1 (P2) where the distance of one reaction tube 910 is measured to the position P2 (P3) where the distance of another reaction tube 910 is to be measured.

The distance measuring device 10 may have a mechanism that displays whether a measured space length is within an allowable range. The pass/fail display may be in a format displayed on a screen, or can include a mechanism for making a sound as necessary.

The distance measuring device 10 may include a mechanism that transfers a measurement result to a personal computer, a mobile terminal, or the like by Bluetooth (registered trademark) or the like and accumulates data.

With reference to FIG. 5 again, the reactor 900 including the plurality of reaction tubes 910 will be described.

The reaction tube 910 can be incorporated into, for example, the reactor with multiple tubes 900 installed in a chemical plant in the field of petrochemical industry. Several thousands to several tens of thousands of the reaction tubes 910 can be incorporated into one reactor 900. The reaction tube 910 can be filled with, for example, a granular catalyst, a granular ceramic (e.g., a spherical body, a ring-shaped body, or the like of silica, alumina, or zirconia), a granular metallic Raschig ring, or the like. The reaction tube 910 has a lower end in its height direction at which a lower end opening 913 communicating with the outside of the reaction tube 910 can be formed. Depending on an intended catalytic reaction, the reaction tube 910 can be formed in a straight tube shape having an inner diameter of 10 mm to 60 mm and a height of 1000 mm to 15000 mm, for example.

The reaction tube 910 may be filled inside with only a solid of the same type, or, for example, with first and second layers 914 and 915 that are respectively composed of solids M1 and M2 different in type at different positions in the height direction of the reaction tube 910 as illustrated in FIG. 5. When the reaction tube 910 is filled inside with solids different in type, the first layer 914 can be composed of the solid M1 in a granular shape. The second layer 915 can be composed of the solid M2 in a granular shape. As the solid M1, for example, a catalyst in a spherical shape for a catalytic reaction molded to have an outer diameter of 1 mm to 15 mm can be used. As the solid M2, for example, a metallic Raschig ring molded in a ring shape (cylindrical shape) can be used. Although not illustrated, the reaction tube 910 may be provided inside with another layer below the second layer 915, the other layer being formed of a solid in a granular shape that is identical in type to the solid M1 or the solid M2, or different in type from the solid M1 or the solid M2.

Each of the solids M1 and M2 is not limited to the type exemplified. Each of the solids M1 and M2 is not also limited in shape and size. Additionally, each of the solids M1 and M2 is not also limited in form (number of layers, height of each layer, and the like) of filling in the reaction tube 910.

<Distance Measuring Device 11 (Second Embodiment)>

Figure 6:
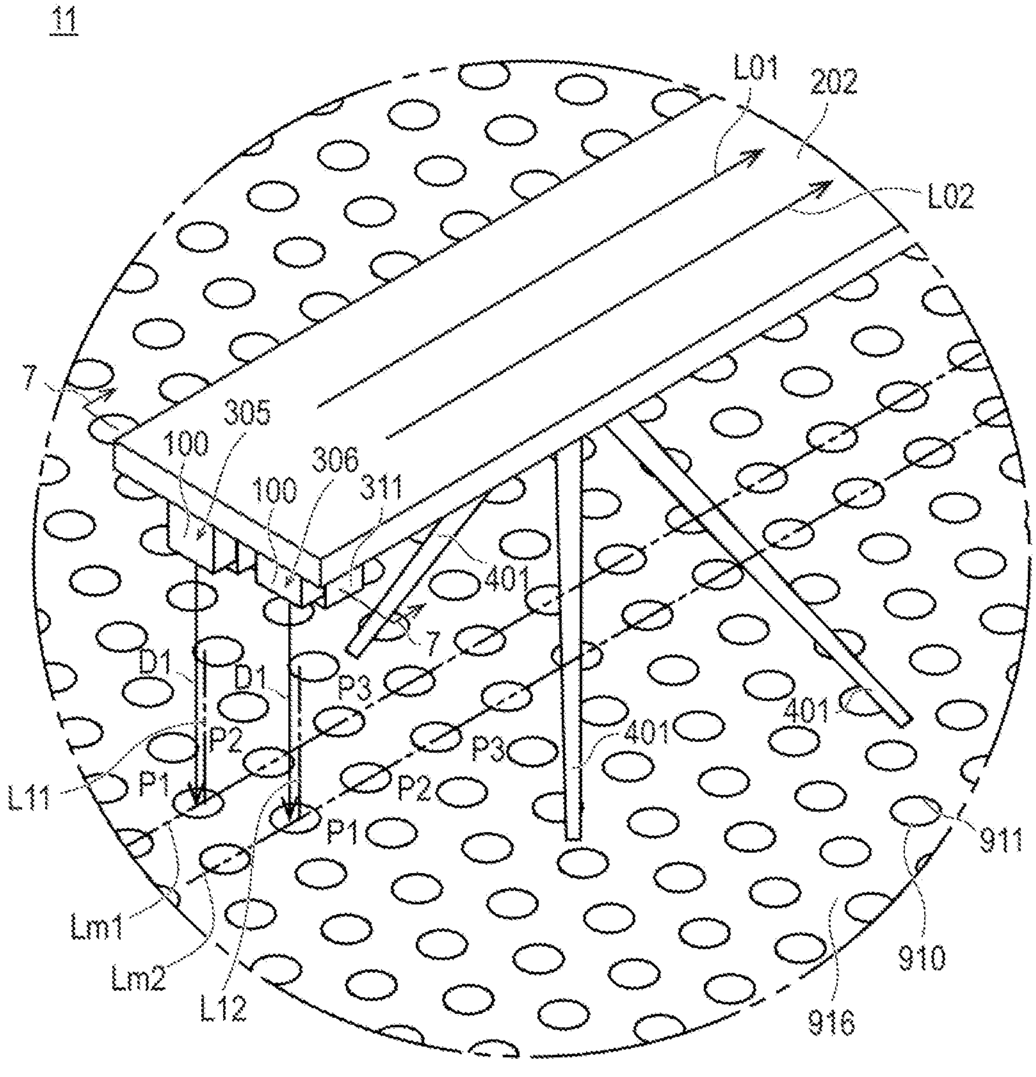
FIG. 6 is a perspective view schematically illustrating a distance measuring device according to a second embodiment.
Figure 7:
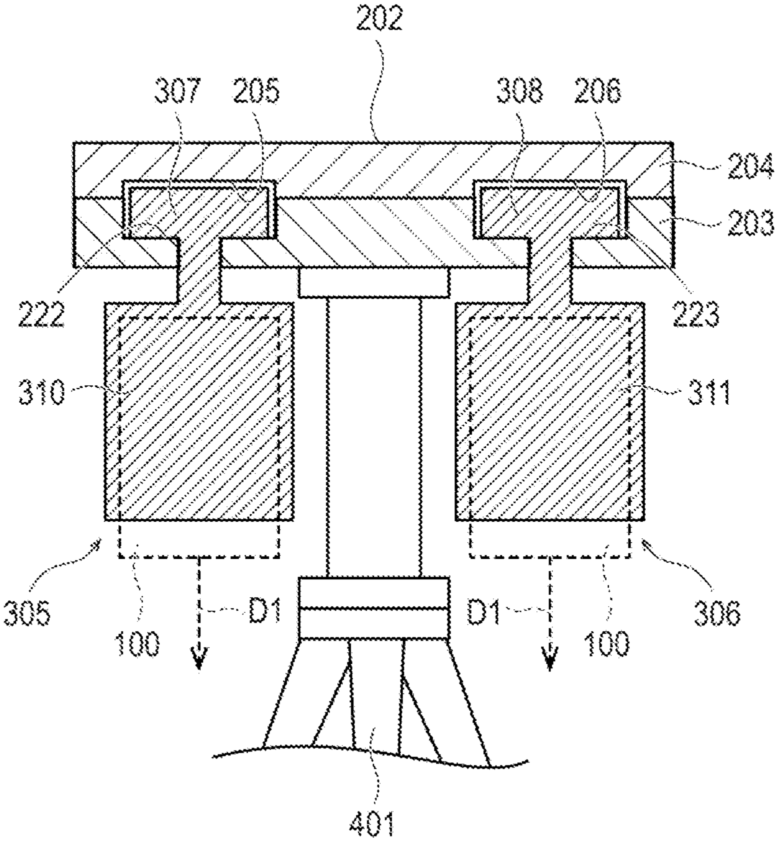
FIG. 7 is a sectional view taken along line 7-7 in FIG. 6.

FIG. 6 is a perspective view schematically illustrating a distance measuring device 11 of a second embodiment, and FIG. 7 is a sectional view taken along line 7-7 of FIG. 6. Members common to the embodiment described above are designated by the same reference numerals and description of the members will be partially eliminated. FIG. 6 shows straight lines Lm1 and Lm2 indicated by two-dot chain lines that indicate rows of reaction tubes 910 for which measuring members 305 and 306 are respectively and sequentially moved to measure space lengths. FIG. 6 shows reference numerals P1, P2, and P3 that schematically indicate positions at each of which the space length is measured by a length measuring instrument 100.

A base member is not limited to being positioned near a tube sheet 916 as in the first embodiment, and can be appropriately modified to be positioned above the tube sheet 916. In this form, a space between the tube sheet 916 and the base member can be used as a movement space of measuring members 305 and 306.

As illustrated in FIGS. 6 and 7, the distance measuring device 11 of the second embodiment can include the measuring members 305 and 306 each holding the length measuring instrument 100, and a rail member 202 (corresponding to the base member) on which the measuring members 305 and 306 are movably disposed. The distance measuring device 11 can include the plurality of (two in the drawing) measuring members 305 and 306, and can include a plurality of (two in the drawing) length measuring instruments 100. In the case of the second embodiment, as illustrated in FIG. 6, two straight lines parallel to the direction in which the two measuring members 305 and 306 disposed on the rail member 202 move are defined as reference lines L01 and L02. When the tube sheet 916 is viewed in plan from above, the reference lines L01 and L02 are parallel to the straight lines Lm1 and Lm2 (rows of the reaction tubes 910 for which the two measuring members 305 and 306 are each sequentially moved to measure the space length) indicated in FIG. 6. As described in FIG. 3A, an angle formed by a straight line L11 parallel to an axial length direction D2 of a reaction tube 910 and the reference line L01, which are on the identical plane, is constant for the plurality of reaction tubes 910 aligned along the reference line L01. An angle formed by a straight line L12 parallel to the axial length direction D2 of the reaction tube 910 and the reference line L02, which are on the identical plane, is constant for the plurality of reaction tubes 910 aligned along the reference line L02. A measurement direction D1 of the length measuring instrument 100 is parallel to the axial length direction D2 of the reaction tube 910 in a state where the measuring members 305 and 306 are disposed above the rail member 202. Then, the measuring members 305 and 306 can be disposed on the rail member 202 to be able to sequentially move from the position P1 (P2) where a distance of one reaction tube 910 is measured to the position P2 (P3) where the distance of another reaction tube 910 is to be measured.

As illustrated in FIG. 7, the measuring members 305 and 306 can be disposed on the contact surfaces 222 and 223 of the rail member 202, respectively. The contact surfaces 222 and 223 of the rail member 202 can be formed into a smooth, continuous plane. In this case, the measuring members 305 and 306 are capable of slidably moving while being disposed on the contact surfaces 222 and 223, respectively, and maintaining a state where the measurement direction D1 of the length measuring instrument 100 is parallel to the axial length direction D2 of the reaction tube 910. When the rail member 202 is viewed in plan from above, the two contact surfaces 222 and 223 can be arranged parallel to each other. The one measuring member 305 can be disposed on the one contact surface 222 and the other measuring member 306 can be disposed on the other contact surface 223.

As illustrated in FIG. 7, the rail member 202 can be formed of a member having a rail shape in section. The rail member 202 of the second embodiment can be formed of, for example, a lower casing 203 and an upper casing 204 covering the lower casing 203. In this case, the rail member 202 can include slide grooves 205 and 206 into which sliders 307 and 308 described later provided in the measuring members 305 and 306 are fitted, respectively. Bottom surfaces of the slide grooves 205 and 206 serve as contact surfaces 222 and 223, respectively. The measuring members 305 and 306 can hang down from the rail member 202 when bottom surfaces of the sliders 307 and 308 are in contact with the contact surfaces 222 and 223 of the slide grooves 205 and 206, respectively.

The distance measuring device 11 can further include support legs 401 that support the rail member 202 and allow the rail member 202 to be detachably attached above the tube sheet 916. The rail member 202 can be disposed above a smooth surface 930 of the tube sheet 916 using the support legs 401. The support legs 401 are not necessarily disposed on the smooth surface 930 of the tube sheet 916 as long as the rail member 202 is disposed stably without wobbling.

The support legs 401 enable the rail member 202 to be positioned above the tube sheet 916. Although structure of the support legs 401 is not particularly limited as long as movement of the measuring members 305 and 306 is not hindered, the structure can be formed of, for example, a tripod or a tetrapod (a tripod in the illustrated example). Each of the support legs 401 has a stretchable structure, and can adjust a height of the rail member 202 from the tube sheet 916. A space between the tube sheet 916 and the rail member 202 can be used as a movement space of the measuring members 305 and 306.

As described in FIGS. 3B(A) and 3B(B), when the rail member 202 is attached to the reactor 900, the axial length direction D2 of the reaction tube 910 is not necessarily perpendicular to the contact surfaces 222 and 223 of the rail member 202. Even when the axial length direction D2 of the reaction tube 910 is not perpendicular to the contact surfaces 222 and 223 of the rail member 202, a distance (space length) from the opening 911 of the reaction tube 910 to a solid 920 can be measured by allowing the measurement direction D1 of the length measuring instrument 100 to be parallel to the axial length direction D2 of the reaction tube 910 in a state where the measuring members 305 and 306 are disposed on the rail member 202.

The measuring members 305 and 306 can include respectively adaptors 310 and 311 holding the length measuring instrument 100, and sliders 307 and 308 disposed on the contact surfaces 222 and 223, respectively, of the rail member 202. The sliders 307 and 308 can be provided in upper portions of the adaptors 310 and 311, respectively. Providing the sliders 307 and 308 enables the measuring members 305 and 306 to be smoothly slidably moved along the rail member 202.

The adaptors 310 and 311 each can have an adjustment mechanism that adjusts an orientation of the measurement direction D1 of the length measuring instrument 100. As with the adaptor 301 of the first embodiment described above, the adjustment mechanism includes a ball head, a plurality of thumbscrew type fixtures, and the like, and can freely adjust the measurement direction D1 of the length measuring instrument 100. The measurement direction D1 of the length measuring instrument 100 is parallel to the axial length direction D2 of the reaction tube 910 in a state where the sliders 307 and 308 are respectively in contact with the contact surfaces 222 and 223 (a state where the measuring members 305 and 306 are disposed above the rail member 202). Adjustment of the measurement direction D1 of the length measuring instrument 100 may be performed by a method similar to that described in the first embodiment. The example of the second embodiment illustrated in FIGS. 6 and 7 includes two length measuring instruments 100, so that the measurement direction D1 of each of the two length measuring instruments 100 is adjusted.

Although the example of the second embodiment includes the rail member 202 having the two contact surfaces 222 and 223, the rail member 202 can be modified to a rail member having only one contact surface or a rail member having three or more contact surfaces.

<Distance Measuring Device 12 (Third Embodiment)>

Figure 8:
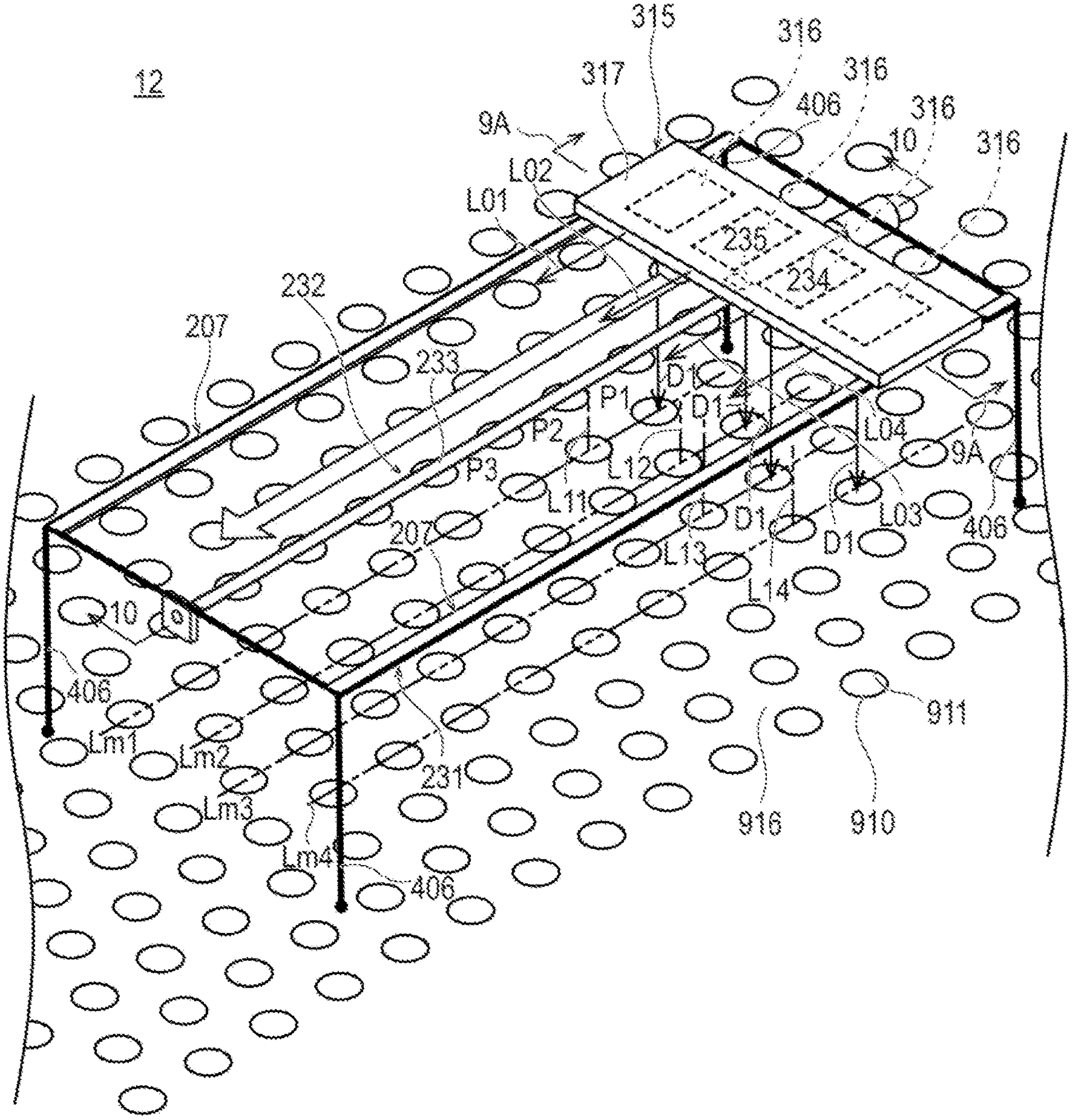
FIG. 8 is a perspective view schematically illustrating a distance measuring device according to a third embodiment.
Figure 9:
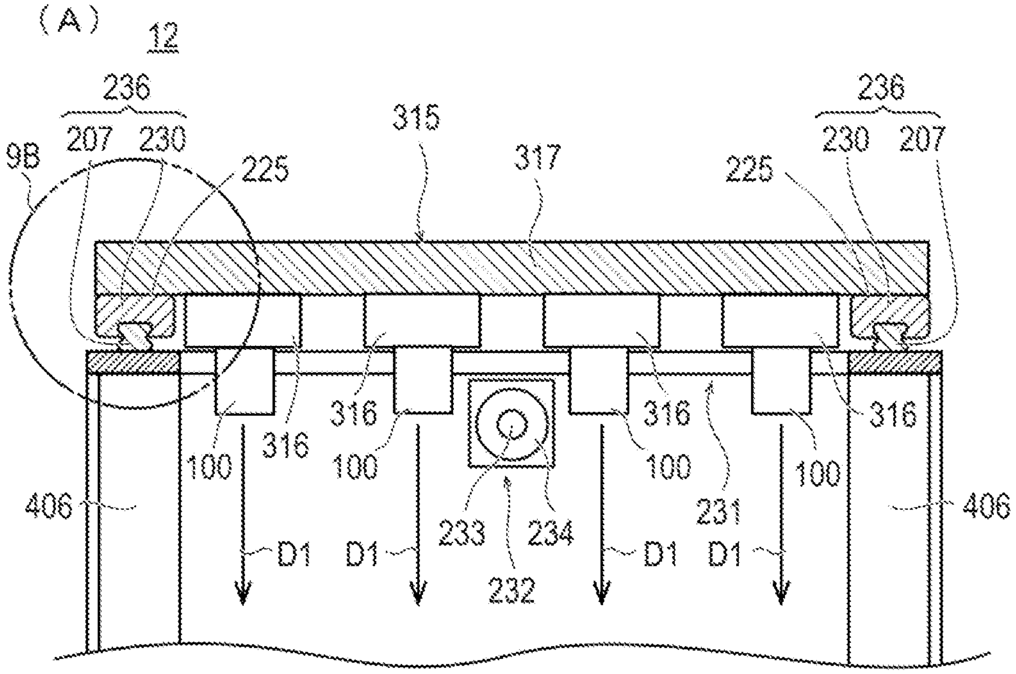
FIG. 9 shows (A) a sectional view taken along line 9A-9A in FIG. 8, and (B) an enlarged sectional view illustrating a portion 9B surrounded by a two-dot chain line in (A) of FIG. 9.
Figure 9:
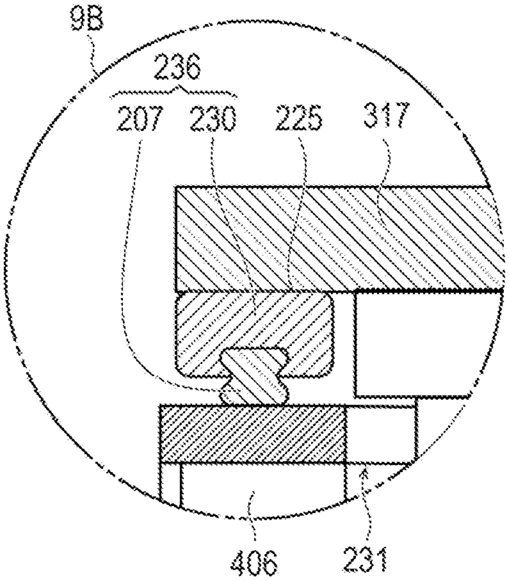
Figure 10:
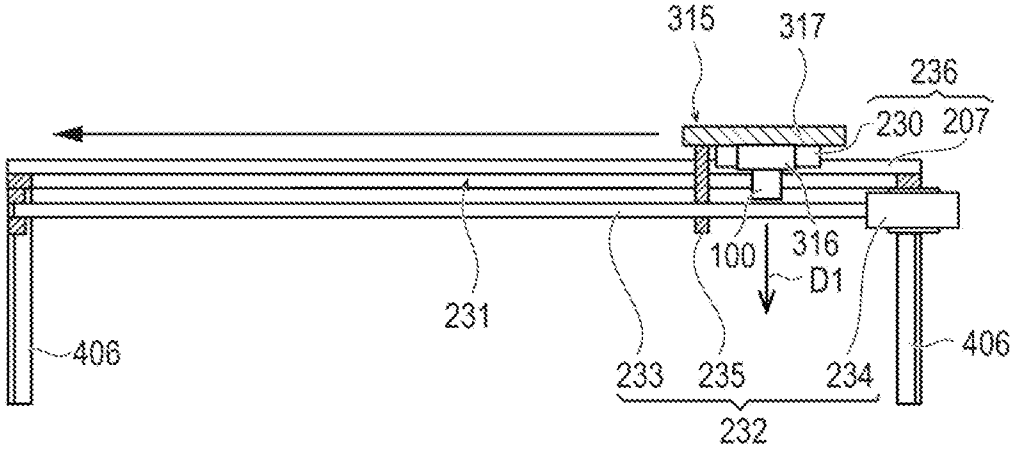
FIG. 10 is a sectional view taken along line 10-10 in FIG. 8.

FIG. 8 is a perspective view schematically illustrating a distance measuring device 12 of a third embodiment, FIG. 9(A) is a sectional view taken along line 9A-9A of FIG. 8, and FIG. 9(B) is an enlarged sectional view illustrating a portion of 9B surrounded by a two-dot chain line in FIG. 9(A). FIG. 10 is a sectional view taken along line 10-10 in FIG. 8. Members common to the embodiment described above are designated by the same reference numerals and description of the members will be partially eliminated. FIG. 8 shows straight lines Lm1, Lm2, Lm3, and Lm4 indicated by two-dot chain lines that indicate rows of reaction tubes 910 for which a measuring member 315 is sequentially moved to measure space lengths using a plurality of length measuring instruments 100. FIG. 8 shows reference numerals P1, P2, and P3 that schematically indicate positions at each of which the space length is measured by one length measuring instrument 100.

The third embodiment is common to the second embodiment in that a base member is positioned above a tube sheet 916, but is different from the second embodiment in specific shapes of the base member and the measuring member.

As illustrated in FIGS. 8, 9(A), 9(B), and 10, the distance measuring device 12 of the third embodiment can include the measuring member 315 holding the length measuring instrument 100 in a suspended state, and a rail member 207 (corresponding to the base member) on which the measuring member 315 is movably disposed. The measuring member 315 can include a plurality of (four in the drawing) length measuring instruments 100. The plurality of length measuring instruments 100 can be arranged in accordance with pitches pa of the reaction tubes 910. In the case of the third embodiment, as illustrated in FIG. 8, four straight lines parallel to the direction in which the measuring member 315 disposed on the rail member 207 moves are defined as reference lines L01, L02, L03, and L04. When the tube sheet 916 is viewed in plan from above, the reference lines L01, L02, L03, and L04 are parallel to the straight lines Lm1, Lm2, Lm3, and Lm4 (rows of the reaction tubes 910 for which measuring members 315 are sequentially moved to measure the space lengths using the plurality of length measuring instruments 100) indicated in FIG. 8. As described in FIG. 3A, an angle formed by a straight line L11 parallel to an axial length direction D2 of a reaction tube 910 and the reference line L01, which are on the identical plane, is constant for the plurality of reaction tubes 910 aligned along the reference line L01. An angle formed by a straight line L12 parallel to the axial length direction D2 of the reaction tube 910 and the reference line L02, which are on the identical plane, is constant for the plurality of reaction tubes 910 aligned along the reference line L02. An angle formed by a straight line L13 parallel to the axial length direction D2 of the reaction tube 910 and the reference line L03, which are on the identical plane, is constant for the plurality of reaction tubes 910 aligned along the reference line L03. An angle formed by a straight line L14 parallel to the axial length direction D2 of the reaction tube 910 and the reference line L04, which are on the identical plane, is constant for the plurality of reaction tubes 910 aligned along the reference line L04. A measurement direction D1 of the length measuring instrument 100 is parallel to the axial length direction D2 of the reaction tube 910 in a state where the measuring member 315 is disposed above the rail member 207. Then, the measuring member 315 can be disposed above the rail member 207 to be able to sequentially move from the position P1 (P2) where a distance of one reaction tube 910 is measured to the position P2 (P3) where the distance of another reaction tube 910 is to be measured.

The measuring member 315 is capable of slidably moving while being disposed above the rail member 207 and maintaining a state where the measurement direction D1 of the length measuring instrument 100 is parallel to the axial length direction D2 of the reaction tube 910. The distance measuring device 12 can include a plurality of rail members 207. When the tube sheet 916 is viewed in plan from above, a plurality of (e.g., two) rail members 207 can be arranged parallel to each other.

As illustrated in FIGS. 9(A) and 9(B), the rail member 207 can be formed of a member having a rail shape in section. The rail member 207 of the third embodiment can be formed of, for example, a rail of a linear guide 236. In this case, a movable block 230 of the linear guide 236 fitted to the rail member 207 can be provided in a slider 317 that is provided in the measuring member 315 and is described later. As is well known, the movable block 230 of the linear guide 236 includes a bearing built in, and can slidably move straight along the rail member 207 by rolling motion of the bearing. The rail and the movable block in the linear guide usually form point contact between a curved surface of the rail and a spherical surface of the bearing. The measuring member 315 can hang down from the rail member 207 when the movable block 230 of the slider 317 is fitted to the rail member 207.

The distance measuring device 12 can further include support legs 406 each of which supports the rail member 207 and allows the rail member 207 to be detachably attached above the tube sheet 916. The rail member 207 can be disposed above a smooth surface 930 of the tube sheet 916 using a support leg 406. The support leg 406 is not necessarily disposed on the smooth surface 930 of the tube sheet 916 as long as the rail member 207 is disposed stably without wobbling.

The support leg 406 enables the rail member 207 to be positioned above the tube sheet 916. Structure of the support leg 406 is not particularly limited as long as movement of the measuring member 315 is not hindered. For example, an angle bar can be used as the support leg 406. Each of the support leg 406 has a stretchable structure, and can adjust a height of the rail member 207 from the tube sheet 916. A space between the tube sheet 916 and the rail member 207 can be used as a movement space of the measuring member 315.

The support leg 406 can support the rail member 207 using a frame body 231 on which the rail member 207 is installed. The frame body 231 can be made of steel plate. The support leg 406 can directly support the rail member 207 without using the frame body 231 to allow the rail member 207 to be detachably attached above the tube sheet 916.

The distance measuring device 12 can include a drive unit 232 that slidably moves the measuring member 315 along the rail member 207. Although structure of the drive unit 232 is not limited, for example, as illustrated in FIGS. 8, 9(A), and 10, the drive unit 232 can include a ball screw 233 rotatably supported by the frame body 231, a motor 234 that rotatably drives the ball screw 233, and an operation plate 235 through which the ball screw 233 is inserted. The motor 234 can be attached to the frame body 231. The operation plate 235 can be attached to the slider 317 of the measuring member 315. The ball screw 233 can fit into a threaded hole in the operation plate 235. When the drive unit 232 has structure as described above, pressing a start button allows the motor 234 to rotationally drive the ball screw 233, and then the operation plate 235 moves in an axial direction of the ball screw 233 because the ball screw 233 is fitted therein. This enables the measuring member 315 to move forward in a direction indicated by a white arrow in FIG. 8. When the ball screw 233 is rotationally driven in an opposite direction by the motor 234, the measuring member 315 can move backward in an opposite direction.

In the linear guide 236, the movable block 230 fitted to the rail member 207 slidably moves straight. In the third embodiment in which the linear guide 236 is used as the rail member 207, an upper surface of the movable block 230 is referred to as a slide surface 225 of the rail member 207 for convenience of description. As described in FIGS. 3B(A) and 3B(B), when the rail member 207 is attached to a reactor 900, the axial length direction D2 of the reaction tube 910 is not necessarily perpendicular to the slide surface 225 of the rail member 207. Even when the axial length direction D2 of the reaction tube 910 is not perpendicular to the slide surface 225 of the rail member 207, a distance (space length) from an opening 911 of the reaction tube 910 to a solid 920 can be measured by allowing the measurement direction D1 of the length measuring instrument 100 to be parallel to the axial length direction D2 of the reaction tube 910 in a state where the measuring member 315 is disposed above the rail member 207.

The measuring member 315 can include an adaptor 316 that holds the length measuring instrument 100 in a suspended state, and the slider 317 disposed above the rail member 207. A plurality of (e.g., four in the illustrated example) adaptors 316 can be disposed on a lower surface of one slider 317. Providing the slider 317 enables the measuring member 315 to be smoothly slidably moved along the rail member 207. A surface of the slider 317 holding the adaptor 316 is parallel to the slide surface 225 of the rail member 207.

The adaptor 316 can have an adjustment mechanism that adjusts an orientation of the length measuring instrument 100 in the measurement direction D1. As with the adaptor 301 of the first embodiment described above, the adjustment mechanism includes a ball head, a plurality of thumbscrew type fixtures, and the like, and can freely adjust the measurement direction D1 of the length measuring instrument 100. A measurement direction D1 of the length measuring instrument 100 is parallel to the axial length direction D2 of the reaction tube 910 in a state where the measuring member 315 is disposed above the rail member 207. Adjustment of the measurement direction D1 of the length measuring instrument 100 may be performed by a method similar to that described in the first embodiment. The third embodiment includes four length measuring instruments 100, so that the measurement direction D1 of each of the four length measuring instruments 100 is adjusted.

Although an example provided with the four length measuring instruments 100 is described in the third embodiment, one to three length measuring instruments 100, or five or more length measuring instruments 100, can be provided.

<Distance Measuring Device 13 (Fourth Embodiment)>

Figure 11:
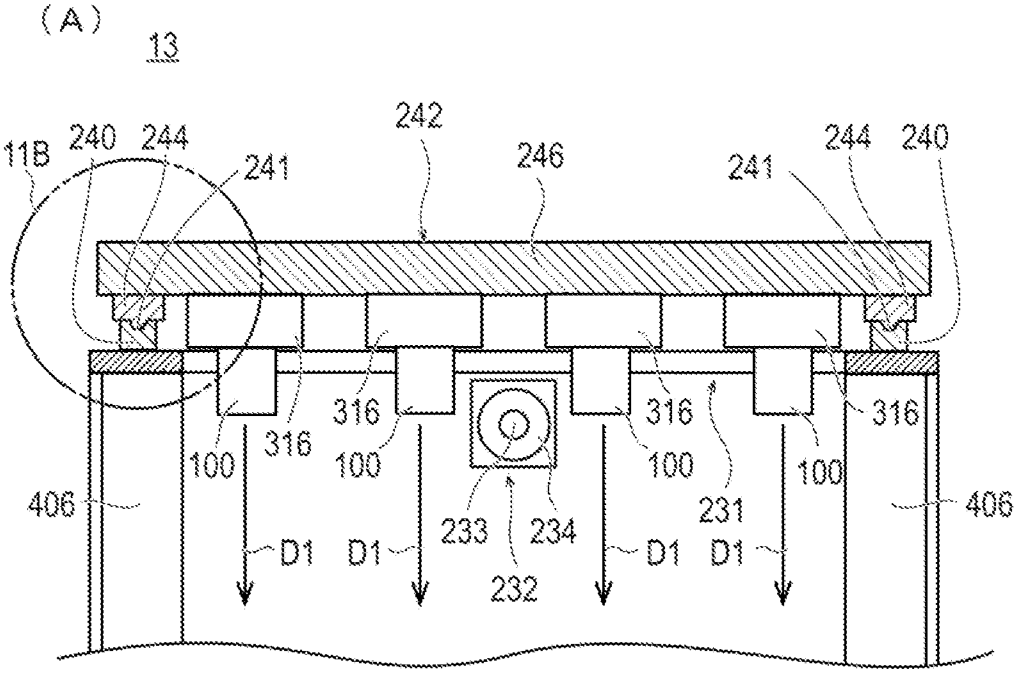
FIG. 11 shows (A) a sectional view illustrating a distance measuring device according to a fourth embodiment and corresponding to (A) of FIG. 9, and (B) an enlarged sectional view illustrating a portion 11B surrounded by a two-dot chain line in (A) of FIG. 11.
Figure 11:
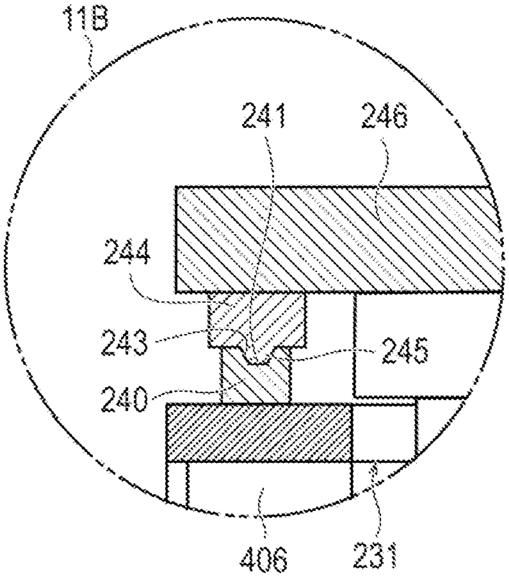

FIG. 11(A) is a sectional view illustrating a distance measuring device according to a fourth embodiment and corresponding to FIG. 9(A), and FIG. 11(B) is an enlarged sectional view illustrating a portion 11B surrounded by a two-dot chain line in FIG. 11(A). Members common to the embodiment described above are designated by the same reference numerals and description of the members will be partially eliminated.

The fourth embodiment is different from the third embodiment in specific shape of a base member, and is common to the third embodiment in other points.

As illustrated in FIGS. 11(A) and 11(B), a distance measuring device 13 of the fourth embodiment can include a measuring member 242 holding a length measuring instrument 100 in a suspended state, and a rail member 240 (corresponding to the base member) on which the measuring member 242 is movably disposed.

As illustrated in FIGS. 11(A) and 11(B), the rail member 240 can be formed of a member having a rail shape in section. The rail member 240 of the fourth embodiment can have a recess 243 having a concave shape in section. In this case, a block 244 fitted in the recess 243 of the rail member 240 can be provided in a slider 246 of the measuring member 242. The block 244 of the slider 246 is guided along the rail member 240 by sliding motion between a protrusion 245 of the block 244 and the recess 243 of the rail member 240. A bottom surface of the recess 243 of the rail member 240 serves as a contact surface 241.

The distance measuring device 13 can include a drive unit 232 that slidably moves the measuring member 242 along the rail member 240. The drive unit 232 can be configured as in the third embodiment.

<Distance Measuring Device 14 (Fifth Embodiment)>

Figure 12:
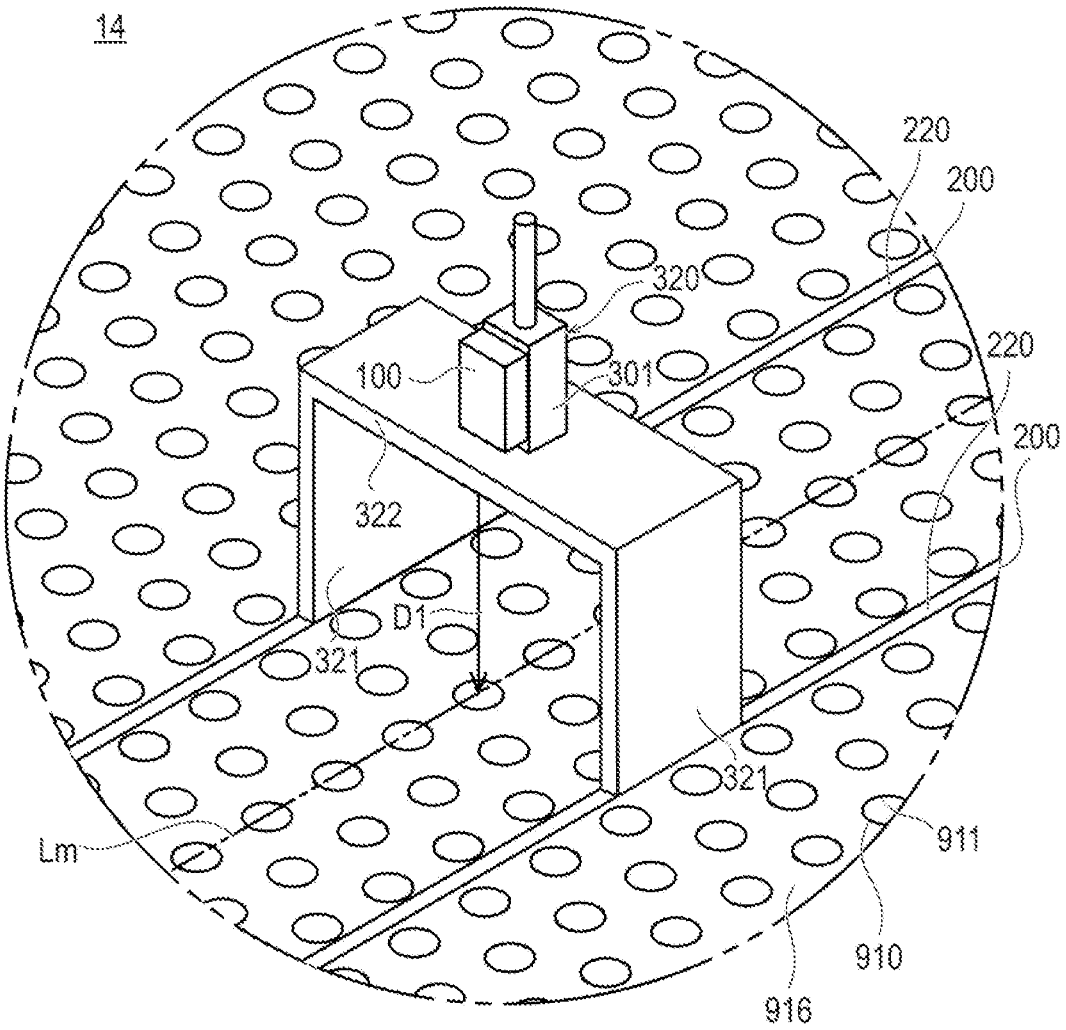
FIG. 12 is a perspective view schematically illustrating a distance measuring device according to a fifth embodiment.

FIG. 12 is a perspective view schematically illustrating a distance measuring device 14 according to a fifth embodiment. Members common to the embodiment described above are designated by the same reference numerals and description of the members will be partially eliminated. FIG. 12 shows a straight line Lm indicated by a two-dot chain line that indicates a row of reaction tubes 910 for which a measuring member 320 is sequentially moved to measure a space length.

As illustrated in FIG. 12, the measuring member 320 of the fifth embodiment can include an adaptor 301 that holds a length measuring instrument 100 and a plate member 321 disposed on a contact surface 220 of a rail member 200. A pair of plate members 321 is connected to a top plate 322 and can form a substantially box shape. The adaptor 301 is attached to the top plate 322. The measuring member 320 can be disposed by allowing a lower end surface of the plate member 321 to be in surface contact with the contact surface 220. Bringing the plate member 321 into surface contact enables the measuring member 320 to be stably disposed above the contact surface 220.

<Distance Measuring Device 15 (Sixth Embodiment)>

Figure 13:
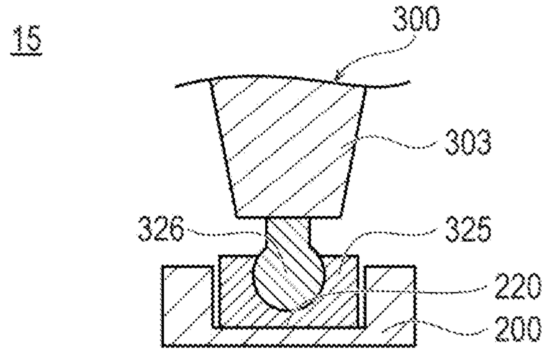
FIG. 13 is a sectional view illustrating a distance measuring device according to a sixth embodiment and corresponding to (B) of FIG. 1.

FIG. 13 is a sectional view illustrating a distance measuring device 15 according to a sixth embodiment and corresponding to FIG. 1(B). Members common to the embodiment described above are designated by the same reference numerals and description of the members will be partially eliminated.

As illustrated in FIG. 13, a measuring member 300 of the sixth embodiment can include a slider 325 disposed on a contact surface 220 of a rail member 200. The slider 325 can be connected to a tip of a leg member 303 using a ball joint 326. The slider 325 can be disposed on the contact surface 220 of the rail member 200 regardless of an attitude of the leg member 303. Providing the slider 325 enables the measuring member 300 to be smoothly slidably moved along the rail member 200.

<Distance Measuring Device 16 (Seventh Embodiment)>

Figure 14:
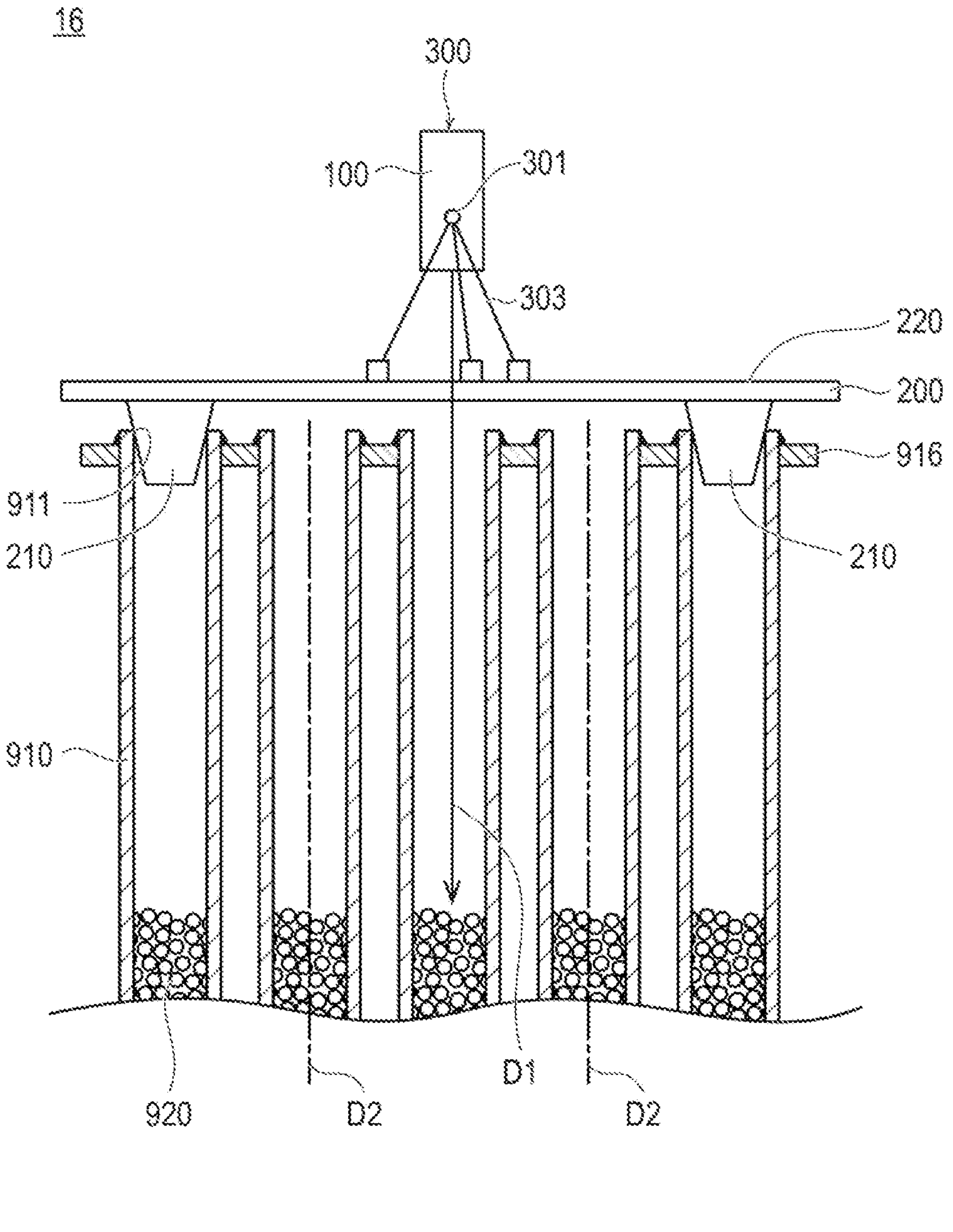
FIG. 14 is a sectional view illustrating a distance measuring device according to a seventh embodiment and corresponding to FIG. 2.

FIG. 14 is a sectional view illustrating a distance measuring device 16 according to a seventh embodiment and corresponding to FIG. 2. Members common to the embodiment described above are designated by the same reference numerals and description of the members will be partially eliminated.

A base member is not limited to being mounted on a tube sheet 916, and can be appropriately modified.

As illustrated in FIG. 14, the distance measuring device 16 of the seventh embodiment can include a rail member 200 (corresponding to the base member) on which a measuring member 300 is movably disposed. The distance measuring device 16 can further include a support leg 210 that supports the rail member 200 and allows the rail member 200 to be detachably attached above the tube sheet 916. The support leg 210 can be attached to a lower surface of the rail member 200. The support leg 210 of the seventh embodiment can have a tapered shape that is tapered toward a tip of the support leg 210 on a lower end side. The tip of the support leg 210 can enter an interior of a reaction tube 910 beyond an opening 911 of the reaction tube 910. A base end of the support leg 210 on an upper end side can have an outer diameter dimension larger than an inner diameter dimension of the opening 911 of the reaction tube 910. Then, the rail member 200 is attached to the reaction tube 910 using the support leg 210 inserted into the opening 911 of the reaction tube 910.

According to the seventh embodiment, even when there is no portion in the tube sheet 916 where the base member can be stably disposed, the rail member 200 as the base member can be laid. In the rail member 200 laid in this manner, as described in FIGS. 3B(A) and 3B(B), the contact surface 220 is not necessarily perpendicular to an axial length direction D2 of the reaction tube 910. Even when the axial length direction D2 of the reaction tube 910 is not perpendicular to the contact surface 220, a distance (space length) from the opening 911 of the reaction tube 910 to a solid 920 can be measured by allowing the measurement direction D1 of the length measuring instrument 100 to be parallel to the axial length direction D2 of the reaction tube 910 in a state where the measuring member 300 is disposed above the contact surface 220.

<Distance Measuring Device 17 (Eighth Embodiment)>

Figure 15:
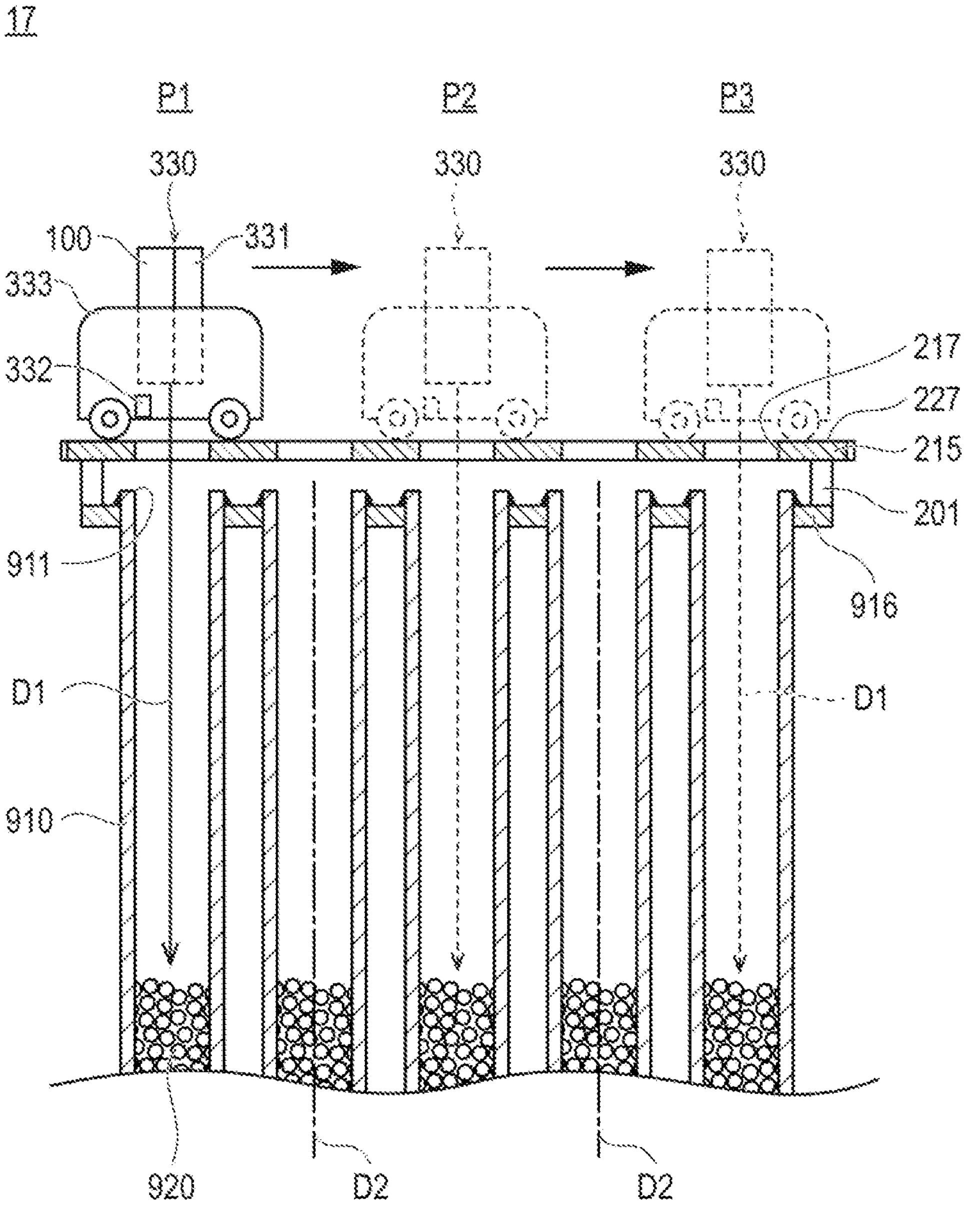
FIG. 15 is a sectional view illustrating a distance measuring device according to an eighth embodiment and corresponding to FIG. 2.

FIG. 15 is a sectional view illustrating a distance measuring device 17 according to an eighth embodiment and corresponding to FIG. 2. Members common to the embodiment described above are designated by the same reference numerals and description of the members will be partially eliminated. FIG. 15 shows reference numerals P1, P2, and P3 that schematically indicate positions at each of which the space length is measured by a length measuring instrument 100.

A base member is not limited to having a rail shape, and can be appropriately modified. Additionally, a measuring member is not limited to a mode of being moved manually by a measurer, and can be appropriately modified.

As illustrated in FIG. 15, the distance measuring device 17 of the eighth embodiment can include a measuring member 330 holding a length measuring instrument 100 and a plate member 215 (corresponding to the base member) on which the measuring member 330 is movably disposed. The measuring member 330 of the eighth embodiment can include a wheeled platform 333 that is disposed on the plate member 215 and is capable of autonomously traveling. A measurement direction D1 of the length measuring instrument 100 is parallel to an axial length direction D2 of a reaction tube 910 in a state where the wheeled platform 333 is disposed on the plate member 215. Then, the wheeled platform 333 can be disposed on the plate member 215 to be able to sequentially move from the position P1 (P2) where a distance of one reaction tube 910 is measured to the position P2 (P3) where the distance of another reaction tube 910 is to be measured.

A contact surface 227 of the plate member 215 can be a smooth continuous plane. The wheeled platform 333 is capable of slidably moving while being disposed on the plate member 215 and maintaining a state where the measurement direction D1 of the length measuring instrument 100 is parallel to the axial length direction D2 of the reaction tube 910.

The plate member 215 can be formed of a member having a plate shape. The plate member 215 can be formed of a perforated plate in which a plurality of through-holes 217 are formed. A through-hole 217 can have substantially the same size as the opening 911 or a size slightly larger than the opening 911. The plurality of through-holes 217 can be formed in accordance with pitches pa of reaction tubes 910. The plate member 215 can be attached to a reactor 900 such that the through-hole 217 and the opening 911 substantially overlap each other.

The distance measuring device 17 can further include a support leg 201 that supports the plate member 215 and allows the plate member 215 to be detachably attached above the tube sheet 916. The support leg 201 can be attached to a lower surface of the plate member 215. The plate member 215 can be disposed above a smooth surface 930 of the tube sheet 916 using the support leg 201. The support leg 201 is not necessarily disposed on the smooth surface 930 of the tube sheet 916 as long as the plate member 215 is disposed stably without wobbling. After being adjusted for an attachment position, the plate member 215 can be fixed to an outer peripheral wall of the reactor 900, the reaction tube 910, and the like using a clamp jig (not illustrated) or the like.

As described in FIGS. 3B(A) and 3B(B), when the plate member 215 is attached to the reactor 900, the axial length direction D2 of the reaction tube 910 is not necessarily perpendicular to the contact surface 227. Even when the axial length direction D2 of the reaction tube 910 is not perpendicular to the contact surface 227, a distance (space length) from the opening 911 of the reaction tube 910 to a solid 920 can be measured by allowing the measurement direction D1 of the length measuring instrument 100 to be parallel to the axial length direction D2 of the reaction tube 910 in a state where the wheeled platform 333 is disposed on the plate member 215.

The wheeled platform 333 includes an adaptor 331 that holds the length measuring instrument 100, and is capable of autonomously traveling on the contact surface 227 of the plate member 215. The wheeled platform 333 can include wheels that are rotationally driven by a motor or the like, a controller that controls drive of the motor and measurement operation of the length measuring instrument 100, a memory that stores a control program and data, a battery, and the like. The wheeled platform 333 can be connected to an external personal computer, a mobile terminal, or the like by Bluetooth (registered trademark) or the like, and can transmit and receive data and a control signal to and from an external device. The wheeled platform 333 can be guided by a guide plate such as an optical reflection plate or a magnetic tape attached to the contact surface 227 of the plate member 215. The wheeled platform 333 can include a sensor 332 such as an optical sensor or a magnetic sensor that detects the guide plate. The wheeled platform 333 can travel along a predetermined route or stop at a predetermined position. The length measuring instrument 100 can irradiate the inside of the reaction tube 910 with a laser through the through-hole 217 of the plate member 215. The wheeled platform 333 enables the length measuring instrument 100 to measure the space length of the reaction tube 910 at a stopped position. The respective through-holes 217 of the plate member 215 can be formed corresponding to the respective reaction tubes 910. Based on a position where the wheeled platform 333 is stopped, a reaction tube 910 present at the position can be identified with the reaction tube 910 on design data. A measurement value of the space length can be stored in association with a number of the reaction tube 910 on the design data.

The wheeled platform 333 is not limited to autonomously traveling along a route determined by guided traveling. The wheeled platform 333 is capable of autonomously traveling along an undetermined route by autonomous traveling. For the autonomous traveling, the wheeled platform 333 can include a sensor for measuring a traveling distance, a gyro sensor for detecting a traveling direction, a sensor for detecting the through-hole 217, and the like.

The wheeled platform 333 of the eighth embodiment can also be applied to the distance measuring device 10 of the first embodiment, the distance measuring device 16 of the seventh embodiment, and the like described above. In this case, the wheeled platform 333 is capable of autonomously traveling on the contact surface 220 of the rail member 200.

Distance measurement in the eighth embodiment does not require the measurer to repeat adjustment work of allowing the measurement direction D1 for measurement using the length measuring instrument 100 to be parallel to the axial length direction D2 of the reaction tube 910 for the reaction tube 910 for which the space length is to be measured by causing the wheeled platform 333 to autonomously travel. Thus, the distance from the opening 911 of the reaction tube 910 to the solid 920 can be simply and quickly measured in a non-contact manner by causing the wheeled platform 333 to sequentially move along the smooth contact surface 227. Additionally, the wheeled platform 333 autonomously travels to measure the space length of the reaction tube 910, so that data collection is further facilitated.

The distance measuring device of the present invention as described above is not particularly limited in means for slidably moving the measuring member, and the measuring member may be moved manually, or may be moved such that a drive device is attached separately and the drive device is activated or stopped by remote operation.

<Method for Measuring Distance Using Distance Measuring Device 10 (First Embodiment)>

Next, a method for measuring a distance from an opening 911 of a reaction tube 910 to a solid 920 in a non-contact manner using the distance measuring device 10 of the first embodiment described above will be described.

A method for measuring a distance according to the present invention includes measuring, in a reactor in which a plurality of reaction tubes arranged parallel to each other is joined to a tube sheet, a distance from an opening formed at an end of a reaction tube in an axial length direction to a solid in a granular shape of a catalyst and/or an inert substance filled in the reaction tube in a non-contact manner for at least some of the plurality of reaction tubes, wherein a measuring member holding a length measuring instrument is movably disposed on a base member, a straight line parallel to a direction in which the measuring member disposed on a base member moves is defined as a reference line, an angle formed by a straight line parallel to the axial length direction of the reaction tube and the reference line, which are on an identical plane, is constant for the plurality of reaction tubes disposed side by side along the reference line, a measurement direction of the length measuring instrument is parallel to the axial length direction of the reaction tube in a state where the measuring member is disposed on the base member, and the distance is sequentially measured by sequentially moving the measuring member from a position where the distance of one of the reaction tubes is measured to a position where the distance of another of the reaction tubes is to be measured.

That is, a method for measuring a distance according to the present invention includes measuring, in a reactor in which a plurality of reaction tubes arranged parallel to each other is joined to a tube sheet, a distance (space length) from an opening formed at an end of a reaction tube in an axial length direction to a solid in a granular shape of a catalyst and/or an inert substance filled in the reaction tube in a non-contact manner for at least some of the plurality of reaction tubes, wherein the distance is measured by a length measuring instrument 100 in a non-contact manner using the distance measuring device 10 of the first embodiment of the present invention.

In the method for measuring a distance using the distance measuring device 10 of the first embodiment, as illustrated in FIGS. 1(A) and 2, first, a rail member 200 (corresponding to the base member) is disposed above a tube sheet 916 using a support leg 201. The contact surface 220 of the rail member 200 can be a smooth continuous plane. A measuring member 300 holding the length measuring instrument 100 is disposed above the contact surface 220 such that a measurement direction D1 of the length measuring instrument 100 is parallel to an axial length direction D2 of the reaction tube 910. At this time, it is preferable to perform correction based on an offset dimension as described above for the length measuring instrument 100 as necessary.

Next, as illustrated in FIG. 2, the measurer slidably moves the measuring member 300 to a position P1, and measures the distance from the opening 911 of the reaction tube 910 to the solid 920 using the length measuring instrument 100 at the position P1. After that, the measurer slidably moves the measuring member 300 from the position P1 to a position P2, and measures the distance from the opening 911 of the reaction tube 910 to the solid 920 using the length measuring instrument 100 at the position P2. Subsequently, the measurer slidably moves the measuring member 300 from the position P2 to a position P3, and measures the distance from the opening 911 of the reaction tube 910 to the solid 920 using the length measuring instrument 100 at the position P3. As described above, the space length is sequentially measured by sequentially slidably moving the measuring member 300 from the position P1 (P2) where the space length of one reaction tube 910 is measured to the position P2 (P3) where the space length of another reaction tube 910 is to be measured.

When the distance from the opening 911 of one reaction tube 910 to the solid 920 is measured, for example, only one position is measured for the position P1, i.e., only one point is measured for the one reaction tube 910, and data on the measurement may be used as a measurement result. Alternatively, the measurement may be performed at multiple positions while slightly sliding the measuring member from the position P1 within a range of the opening 911, and an arithmetic average of data on the measurement may be acquired to obtain a measurement result. It is preferable to use a result based on data measured at multiple positions for the distance from the opening 911 of one reaction tube 910 to the solid 920 because a measurement error is reduced.

An angle α formed by a straight line L1 parallel to the axial length direction D2 of the reaction tube 910 and a reference line L0 parallel to a direction in which the measuring member 300 disposed on the rail member 200 moves, which are on an identical plane N, is constant for the plurality of reaction tubes 910 aligned along the reference line L0 (see FIG. 3A). Additionally, the measurement direction D1 of the length measuring instrument 100 is parallel to the axial length direction D2 of the reaction tube 910 in a state where the measuring member 300 is disposed above the rail member 200. Thus, even when the measuring member 300 is slidably moved along the rail member 200, the measurement direction D1 of the length measuring instrument 100 is parallel to the axial length direction D2 of any reaction tube 910 for which the space length is to be measured. This enables space lengths of the plurality of reaction tubes 910 to be sequentially measured by slidably moving the measuring member 300 along the rail member 200. For a row of the reaction tubes 910 (the straight line Lm in FIG. 1(A)) for each of which the space length is measured by slidably moving the measuring member 300, the measurer does not need to repeat adjustment work of allowing the measurement direction D1 measured by the length measuring instrument 100 to be parallel to the axial length direction D2 of the reaction tube 910. Thus, the distance from the opening 911 of the reaction tube 910 to the solid 920 can be simply and quickly measured in a non-contact manner by sequentially moving the measuring member 300 along the rail member 200.

Through shortening of measurement time of a filling height of a filling, a construction period at work of filling or replacing the filling can be shortened, so that cost associated with the work can be reduced, and thus this can also contribute to improvement of a plant operation rate. Additionally, variations in the filling height of the catalyst and the like filled in the reaction tube 910 of the reactor with multiple tubes 900 can be efficiently reduced, so that a catalytic reaction can be performed in a preferable state.

In the measurement method of the present invention, not only the distance measuring device 10 of the first embodiment but also the distance measuring devices 14, 15, 16, and 17 of the fifth embodiment (FIG. 12), the sixth embodiment (FIG. 13), the seventh embodiment (FIG. 14), and the eighth embodiment (FIG. 15) can be used similarly.

<Method for Measuring Distance Using Distance Measuring Device 11 (Second Embodiment)>

Next, a method for measuring a distance from an opening 911 of a reaction tube 910 to a solid 920 in a non-contact manner using the distance measuring device 11 of the second embodiment described above will be described.

That is, a method for measuring a distance according to the present invention includes measuring, in a reactor in which a plurality of reaction tubes arranged parallel to each other is joined to a tube sheet, a distance (space length) from an opening formed at an end of a reaction tube in an axial length direction to a solid in a granular shape of a catalyst and/or an inert substance filled in the reaction tube in a non-contact manner for at least some of the plurality of reaction tubes, wherein the distance is measured by a length measuring instrument 100 in a non-contact manner using the distance measuring device 11 of the second embodiment of the present invention.

In the method for measuring a distance of the second embodiment, as illustrated in FIGS. 6 and 7, first, a rail member 202 (corresponding to a base member) is disposed above a tube sheet 916 using a support leg 401. The contact surfaces 222 and 223 of the rail member 202 can be formed into a smooth, continuous plane. The support legs 401 enable the rail member 202 to be positioned above the tube sheet 916. Measuring members 305 and 306 holding the length measuring instrument 100 are disposed on the rail member 202 such that sliders 307 and 308 are in contact with the contact surfaces 222 and 223, respectively, and a measurement direction D1 of the length measuring instrument 100 is parallel to an axial length direction D2 of the reaction tube 910.

Next, as illustrated in FIG. 6, the measurer slidably moves the measuring members 305 and 306 to a position P1, and measures the space length of the reaction tube 910 using the length measuring instrument 100 at the position P1. After that, the measurer slidably moves the measuring members 305 and 306 from the position P1 to a position P2, and measures the space length of the reaction tube 910 using the length measuring instrument 100 at the position P2. Subsequently, the measurer slidably moves the measuring members 305 and 306 from the position P2 to a position P3, and measures the space length of the reaction tube 910 using the length measuring instrument 100 at the position P3. As described above, the space length is sequentially measured by sequentially slidably moving the measuring members 305 and 306 from the position P1 (P2) where the space length of one reaction tube 910 is measured to the position P2 (P3) where the space length of another reaction tube 910 is to be measured.

Next, the measurer sequentially slidably moves another measuring members 305 and 306 from the position P1 (P2) where the space length of one reaction tube 910 is to be measured to the position P2 (P3) where the space length of the other reaction tube 910 is to be measured, as in the above procedure, and sequentially measures the space length. As described above, the measurement may be performed at multiple points for one reaction tube 910 while a measurement position is shifted little by little.

An angle formed by each of straight lines L11 and L12 parallel to the axial length direction D2 of the reaction tube 910, and each of reference lines L01 and L02 parallel to a direction in which the measuring members 305 and 306 disposed on the rail member 202 moves, which are on an identical plane, is constant for the plurality of reaction tubes 910 aligned along the reference lines L01 and L02. Additionally, the measurement direction D1 of the length measuring instrument 100 is parallel to the axial length direction D2 of the reaction tube 910 in a state where the measuring members 305 and 306 are disposed above the rail member 202. Thus, even when the measuring members 305 and 306 are slidably moved along the rail member 202, the measurement direction D1 of the length measuring instrument 100 is parallel to the axial length direction D2 of any reaction tube 910 for which the space length is to be measured. This enables space lengths of the plurality of reaction tubes 910 to be sequentially measured by slidably moving the measuring members 305 and 306 along the rail member 202. For rows of the reaction tubes 910 (straight lines Lm1 and Lm2 in FIG. 6) for each of which the space length is measured by slidably moving the measuring members 305 and 306, the measurer does not need to repeat adjustment work of allowing the measurement direction D1 for measurement using the length measuring instrument 100 to be parallel to the axial length direction D2 of the reaction tube 910. Thus, the distance from the opening 911 of the reaction tube 910 to the solid 920 can be simply and quickly measured in a non-contact manner by sequentially moving the measuring members 305 and 306 along the rail member 202.

<Method for Measuring Distance Using Distance Measuring Device 12 (Third Embodiment)>

Next, a method for measuring a distance from an opening 911 of a reaction tube 910 to a solid 920 in a non-contact manner using the distance measuring device 12 of the third embodiment described above will be described.

That is, a method for measuring a distance according to the present invention includes measuring, in a reactor in which a plurality of reaction tubes arranged parallel to each other is joined to a tube sheet, a distance (space length) from an opening formed at an end of a reaction tube in an axial length direction to a solid in a granular shape of a catalyst and/or an inert substance filled in the reaction tube in a non-contact manner for at least some of the plurality of reaction tubes, wherein the distance is measured by a length measuring instrument 100 in a non-contact manner using the distance measuring device 12 of the third embodiment of the present invention.

In the method for measuring a distance of the third embodiment, as illustrated in FIG. 8, first, a rail member 207 (corresponding to a base member) is disposed on a tube sheet 916 using a support leg 406. The support leg 406 enables the rail member 207 to be positioned above the tube sheet 916. A measuring member 315 holding the length measuring instrument 100 is disposed on the rail member 207 such that a movable block 230 of the slider 317 is fitted to the rail member 207 and a measurement direction D1 of the length measuring instrument 100 is parallel to an axial length direction D2 of the reaction tube 910.

Next, as illustrated in FIG. 8, the measurer slidably moves the measuring member 315 to a position P1, and measures space lengths of four reaction tubes 910 using respective four length measuring instruments 100 at the position P1. After that, the measurer slidably moves the measuring member 315 from the position P1 to a position P2, and measures the space lengths of the four reaction tubes 910 using the respective four length measuring instruments 100 at the position P2. Subsequently, the measurer slidably moves the measuring member 315 from the position P2 to a position P3, and measures the space lengths of the four reaction tubes 910 using the respective four length measuring instruments 100 at the position P3. As described above, the space length is sequentially measured by sequentially slidably moving the measuring member 315 from the position P1 (P2) where the space length of one reaction tube 910 is measured to the position P2 (P3) where the distance of another reaction tube 910 is to be measured. As described above, the measurement may be performed at multiple points for one reaction tube 910 while a measurement position is shifted little by little.

An angle formed by each of straight lines L11, L12, L13, and L14 parallel to the axial length direction D2 of the reaction tube 910, and each of reference lines L01, L02, L03, and L04 parallel to a direction in which the measuring member 315 disposed on the rail member 207 moves, which are on an identical plane, is constant for the plurality of reaction tubes 910 aligned along the reference lines L01, L02, L03, and L04. Additionally, the measurement direction D1 of the length measuring instrument 100 is parallel to the axial length direction D2 of the reaction tube 910 in a state where the measuring member 315 is disposed above the rail member 207. Thus, even when the measuring member 315 is slidably moved along the rail member 207, the measurement direction D1 of the length measuring instrument 100 is parallel to the axial length direction D2 of any reaction tube 910 for which the space length is to be measured. This enables the space lengths of the plurality of reaction tubes 910 to be measured. For rows of the reaction tubes 910 (straight lines Lm1, Lm2, Lm3, and Lm4 in FIG. 8) for each of which the space length is measured by slidably moving the measuring member 315, the measurer does not need to repeat adjustment work of allowing the measurement direction D1 for measurement using the length measuring instrument 100 to be parallel to the axial length direction D2 of the reaction tube 910. Thus, the distance from the opening 911 of the reaction tube 910 to the solid 920 can be simply and quickly measured in a non-contact manner by sequentially moving the measuring member 315 along the rail member 207.

In the measurement method of the present invention, not only the distance measuring device 12 of the third embodiment but also the distance measuring device 13 of the fourth embodiment (FIGS. 11(A) and 11(B)) can be used similarly.

Reference Example 1 of Method for Measuring Distance

Next, as Reference Example 1 of a method for measuring a distance, a method for measuring a distance from an opening 911 of a reaction tube 910 to a solid 920 in a non-contact manner using a tube sheet 916 having a continuous smooth surface 930 will be described.

Figure 16:
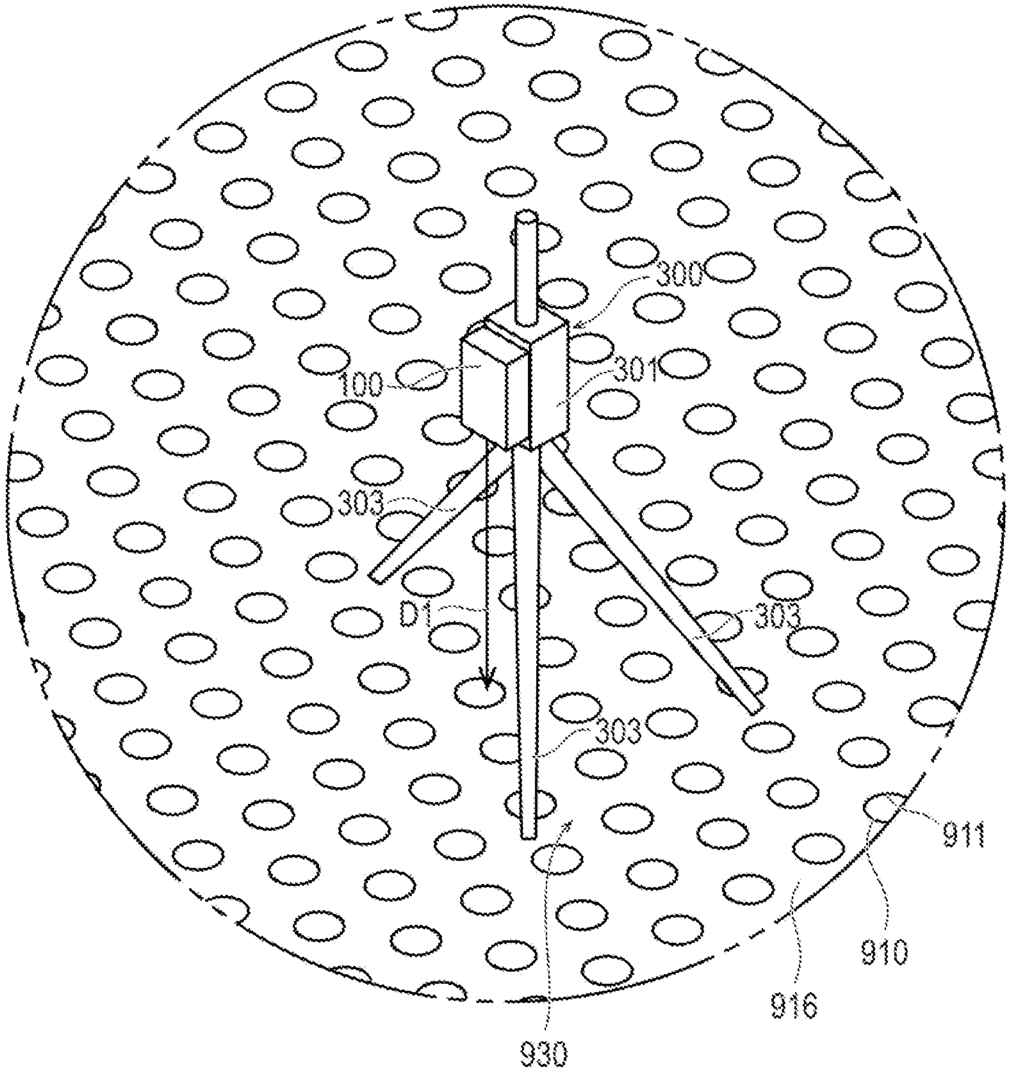
FIG. 16 is a perspective view schematically illustrating a state of embodying Reference Example 1 of a method for measuring a distance.

FIG. 16 is a perspective view schematically illustrating a state of embodying Reference Example 1 of the method for measuring a distance. Members common to the embodiment described above are designated by the same reference numerals and description of the members will be partially eliminated.

As illustrated in FIGS. 4(A) and 4(B), a tube sheet surface is uneven due to welding marks such as weld beads and spatter, and thus causing a non-smooth portion. However, the welding marks are concentrated on an outer peripheral portion of the reaction tube 910, so that an intermediate portion between one reaction tube 910 and another reaction tube 910 adjacent thereto may have no welding mark, and thus the tube sheet 916 may have a continuous smooth surface 930 without interruption. In such a case, an angle formed by the smooth surface 930 of the tube sheet 916 and an axial length direction D2 of the reaction tube 910 is usually constant, so that a measuring member 300 can be slidably moved while being in contact with the smooth surface 930 on the tube sheet 916.

The measuring member 300 can be formed as with the measuring member 300 of the first embodiment described above. The measuring member 300 can include an adaptor 301 that holds a length measuring instrument 100 and three or more (three in the drawing) leg members 303 disposed on the smooth surface 930 of the tube sheet 916. The three leg members 303 can be formed using a tripod, for example. Each of the leg members 303 has a stretchable structure and can be adjusted in length. The measuring member 300 can be disposed above the tube sheet 916 with tips of the leg members 303 in contact with the smooth surface 930. Only one adaptor 301 holding the length measuring instrument 100 may be connected to one tripod, or a plurality of adapters may be connected to the one tripod. When a plurality of length measuring instruments 100 can be held on the leg members 303 (tripod), space lengths of a plurality of reaction tubes 910 can be simultaneously measured.

In Reference Example 1 of the method for measuring a distance, as illustrated in FIG. 16, first, the measuring member 300 holding the length measuring instrument 100 is brought into contact with the smooth surface 930 of the tube sheet 916, and is disposed above the tube sheet 916 such that a measurement direction D1 of the length measuring instrument 100 is parallel to the axial length direction D2 of the reaction tube 910.

Next, the measurer sequentially measures a space length by sequentially slidably moving the measuring member 300 in contact with the smooth surface 930 of the tube sheet 916.

The reaction tubes 910 are parallel to each other. Thus, even when the measuring member 300 is slidably moved along the smooth surface 930 of the tube sheet 916, the tube sheet 916 having the continuous smooth surface 930 allows the measurement direction D1 of the length measuring instrument 100 to be parallel to the axial length direction D2 of any reaction tube 910 for which the space length is to be measured. Thus, in such a case, the space lengths of the plurality of reaction tubes 910 can be sequentially measured by slidably moving the measuring member 300 along the smooth surface 930 of the tube sheet 916. The measurer does not need to repeat adjustment work of allowing the measurement direction D1 for measurement using the length measuring instrument 100 to be parallel to the axial length direction D2 of the reaction tube 910. Thus, when the measuring member 300 is sequentially moved along the smooth surface 930 of the tube sheet 916 to be rearranged at an appropriate position, the distance from the opening 911 of each of the plurality of reaction tubes 910 to the solid 920 can be simply and quickly measured in a non-contact manner.

Reference Example 2 of Method for Measuring Distance

Next, as Reference Example 2 of a method for measuring a distance, a method for measuring a distance from an opening 911 of a reaction tube 910 to a solid 920 in a non-contact manner using a tube sheet 916 having a discontinuous smooth surface 930 will be described.

Figure 17:
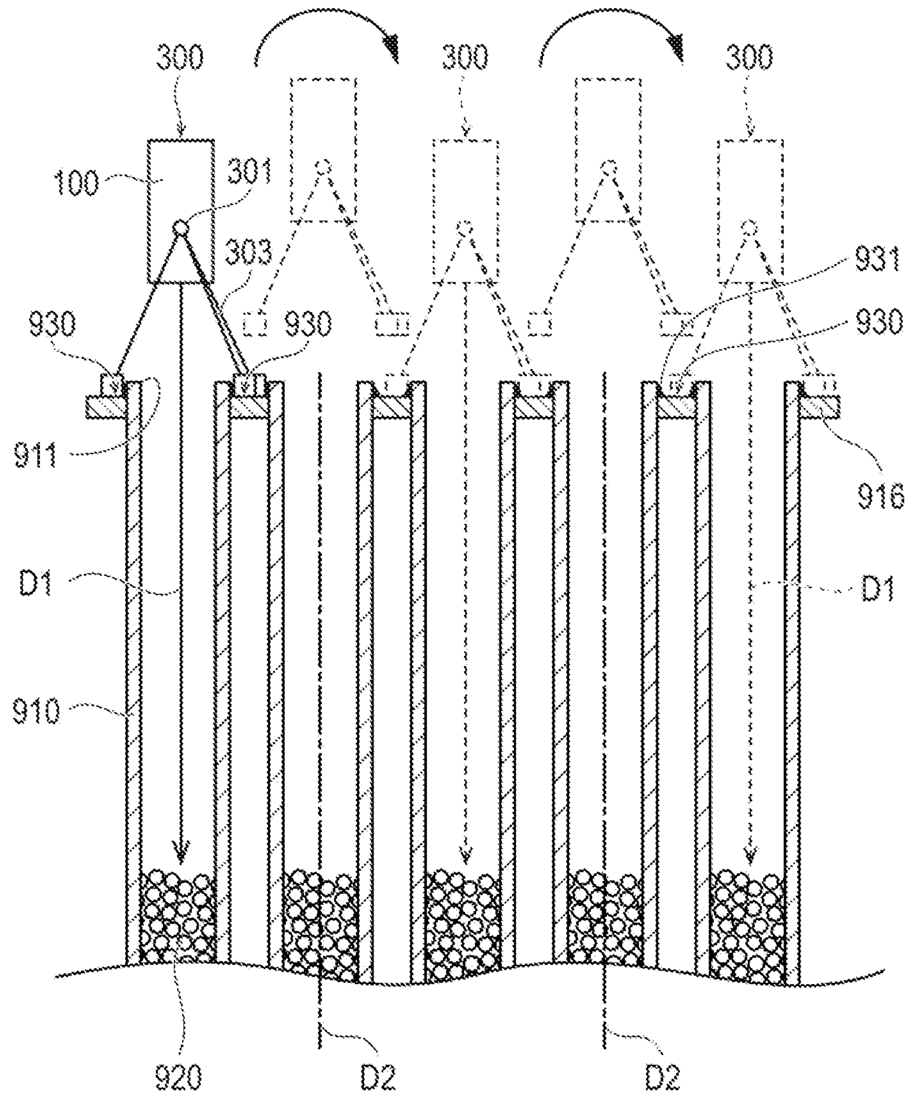
FIG. 17 is a view schematically illustrating a state of embodying Reference Example 2 of a method for measuring a distance.
Figure 18:
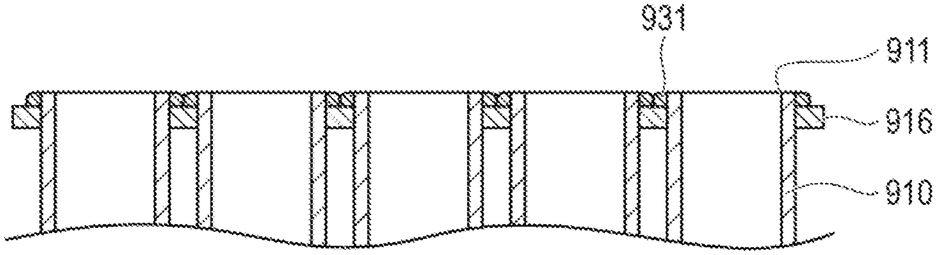
FIG. 18 shows (A) a sectional view illustrating a tube sheet to which a plurality of reaction tubes is joined, and (B) a top view of (A) of FIG. 18 illustrating the tube sheet.
Figure 18:
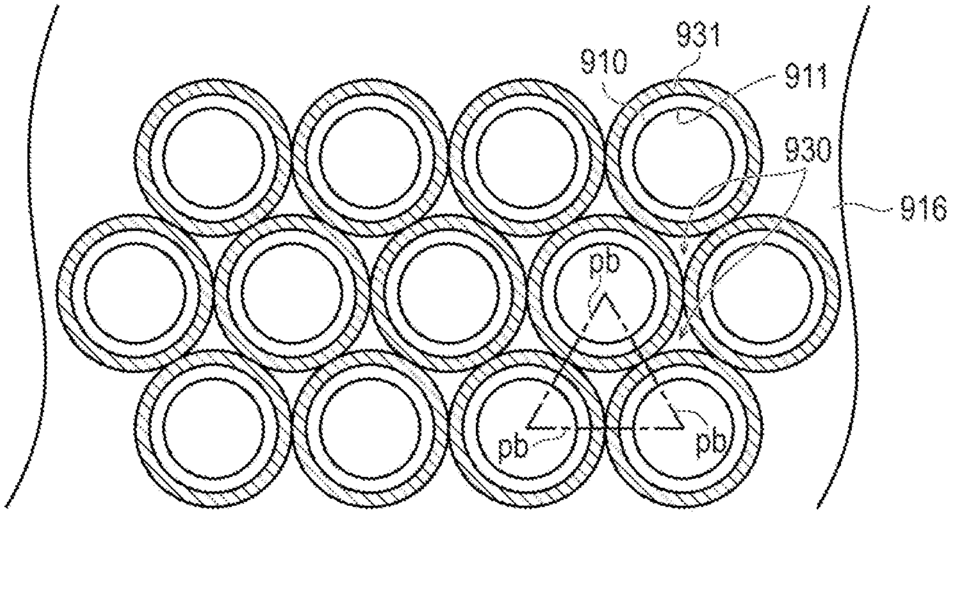

FIG. 17 is a view schematically illustrating a state of embodying Reference Example 2 of the method for measuring a distance. FIG. 18(A) is a sectional view illustrating a tube sheet 916 to which a plurality of reaction tubes 910 is joined, and FIG. 18(B) is a top view of FIG. 18(A) illustrating the tube sheet 916. Members common to the embodiments described above and Reference Example 1 of the method for measuring a distance are designated by the same reference numerals and description of the members will be partially eliminated.

As illustrated in FIGS. 18(A) and 18(B), the tube sheet surface has unevenness due to welding marks such as weld beads and spatter, and thus causing a non-smooth portion. Depending on a pitch pb of the reaction tube 910, the smooth surface 930 of the tube sheet 916 may be surrounded by a protrusion 931, and may not be regularly or irregularly continuous. Although the smooth surface 930 of the tube sheet 916 normally forms a constant angle with the axial length direction D2 of the reaction tube 910, the smooth surface 930 is not continuous in a case as described above, and thus the measuring member 300 cannot be sequentially slidably moved along the smooth surface 930 of the tube sheet 916 as in Reference Example of the method for measuring a distance. Thus, the measuring member 300 is moved while being separated from the tube sheet 916, i.e., while being lifted. The protrusion 931 is, for example, a weld bead produced when the reaction tube 910 is welded and joined to the tube sheet 916. When a relative position of the smooth surface 930 surrounded by the protrusion 931 has almost no deviation, the distance from the opening 911 of each of the plurality of reaction tubes 910 to the solid 920 can be sequentially measured by lifting and moving the measuring member 300 without adjusting a position and length of each of the leg members 303 each time.

In Reference Example 2 of the method for measuring a distance, as illustrated in FIG. 17, first, the measuring member 300 holding the length measuring instrument 100 is brought into contact with the smooth surface 930 surrounded by the protrusion 931, and is disposed above the tube sheet 916 such that the measurement direction D1 of the length measuring instrument 100 is parallel to the axial length direction D2 of the reaction tube 910.

Next, the measurer sequentially measures the space length by sequentially moving the measuring member 300 in a state of being separated from the smooth surface 930 of the tube sheet 916, and bringing the measuring member 300 into contact with another smooth surface 930 to dispose the measuring member 300 on the tube sheet 916.

The smooth surface 930 of the tube sheet 916 usually forms a constant angle with the axial length direction D2 of the reaction tube 910, and the reaction tubes 910 are parallel to each other. Thus, when a relative position of the smooth surface 930 surrounded by the protrusion 931 has almost no deviation, the measuring member 300 is disposed at an appropriate position even when the measuring member 300 is lifted and moved from the smooth surface 930 of the tube sheet 916. In this case, the measurement direction D1 of the length measuring instrument 100 is parallel to the axial length direction D2 of the plurality of reaction tubes 910, the measurer does not need to repeat adjustment work of allowing the measurement direction D1 for measurement using the length measuring instrument 100 to be parallel to the axial length direction D2 of each of the plurality of reaction tubes 910. Thus, the distance from the opening 911 of the reaction tube 910 to the solid 920 can be simply and quickly measured in a non-contact manner by sequentially moving the measuring member 300 along the smooth surface 930 of the tube sheet 916. Only one adaptor 301 holding the length measuring instrument 100 may be connected to one tripod, or a plurality of adaptors may be connected to the one tripod. When a plurality of length measuring instruments 100 can be held on the leg members 303 (tripod), space lengths of a plurality of reaction tubes 910 can be simultaneously measured.

Although the distance measuring device and the method for measuring a distance of the present invention have been described above through various embodiments and modifications, the present invention is not limited only to the contents described in the specification, and can be appropriately changed based on the description of the scope of claims.

For example, in the first embodiment (FIG. 1(A) and FIG. 2), the second embodiment (FIG. 7), the third embodiment (FIGS. 8 and 9(A)), the fourth embodiment (FIG. 11(A)), the fifth embodiment (FIG. 12), the sixth embodiment (FIG. 13), the seventh embodiment (FIG. 14), and Reference Example 1 of the method for measuring a distance (FIG. 16), the measuring member may be provided at its end in contact with the contact surface with a rollable roller, caster, or the like. Then, the measuring member can move more smoothly on the contact surface.

REFERENCE SIGNS LIST

10, 11, 12, 13, 14, 15, 16, 17 distance measuring device
100 length measuring instrument
200 rail member (base member)
201 support leg
202 rail member (base member)
203 lower casing
204 upper casing
205, 206 slide groove
207 rail member (base member)
210 support leg
215 plate member (base member)
217 through-hole
220 contact surface
221 guide groove
222, 223 contact surface
225 slide surface
227 contact surface
230 movable block
231 frame body
232 drive unit
233 ball screw
234 motor
235 operation plate
236 linear guide
240 rail member
241 contact surface
242 measuring member
243 recess
244 block
245 protrusion
246 slider
300 measuring member
301 adaptor
303 leg member
305, 306 measuring member
307, 308 slider
310, 311 adaptor
315 measuring member
316 adaptor
317 slider
320 measuring member
321 plate member
322 top plate
325 slider
326 ball joint
330 measuring member
331 adaptor
332 sensor
333 wheeled platform
341 base member
341*a* contact surface
342 measuring member
342*a* contact surface
343 base member
343*a* contact surface
344 measuring member
344*a* contact surface
345 base member
345*a* contact surface
346 measuring member
346*a* contact surface
347 base member
347*a* contact surface
348 measuring member
348*a* contact surface
401 support leg
406 support leg
900 reactor
910 reaction tube
911 opening
913 lower end opening
914 first layer
915 second layer
916 tube sheet
920 solid
930 smooth surface
931 protrusion
D1 measurement direction
D2 axial length direction
L0, L01, L02, L03, L04 reference line (straight line parallel to direction in which measuring member disposed on base member moves)
L1, L11, L12, L13, L14 straight line parallel to axial length direction of reaction tube
Lm, Lm1, Lm2, Lm3, Lm4 row of reaction tubes for which measuring members are sequentially moved to measure space length
M1 solid
M2 solid
N plane
P1, P2, P3 position where space length is measured by length measuring instrument
pa, pb pitch
α angle formed by straight line parallel to axial length direction of reaction tube and reference line, which are on identical plane

The invention claimed is:

1. A distance measuring device that measures, in a reactor in which a plurality of reaction tubes arranged parallel to each other is joined to a tube sheet, a distance from an opening formed at an end of a reaction tube in an axial length direction to a solid in a granular shape of a catalyst and/or an inert substance filled in the reaction tube in a non-contact manner for at least some of the plurality of reaction tubes, the distance measuring device comprising:

a measuring member holding a length measuring instrument;

at least one base member having a surface on which the measuring member is movably disposed;

an adjustment mechanism configured to adjust a measurement direction and an angle of the length measuring instrument, wherein the angle is adjustable so that the measurement direction is adjusted to be parallel to the axial length direction of the reaction tube when the axial length direction of the reaction tube is not perpendicular to the surface of the base member; and support legs that support the base member and allow the base member to be detachably attached above the tube sheet, wherein the support legs are stretchable, and a height of each of the support legs is adjustable, wherein when a straight line parallel to a direction in which the measuring member disposed on the base member moves is defined as a reference line, an angle formed by a straight line parallel to an axial length direction of the reaction tube and the reference line, which are on an identical plane, is constant for the plurality of reaction tubes disposed side by side along the reference line, the measurement direction of the length measuring instrument is parallel to the axial length direction of the reaction tube in a state where the measuring member is disposed on the base member, and the measuring member is disposed on the base member to be able to sequentially move from a position where the distance of one of the reaction tubes is measured to a position where the distance of another of the reaction tubes is to be measured.

2. The distance measuring device according to claim 1, wherein the measuring member is capable of slidably moving.

3. The distance measuring device according to claim 1, wherein the base member has a rail shape or a plate shape.

4. The distance measuring device according to claim 1, wherein the base member is attached to the reaction tube using the support legs inserted into the opening of the reaction tube.

5. The distance measuring device according to claim 1, wherein the measuring member includes three or more leg members disposed on the base member.

6. The distance measuring device according to claim 1, wherein the measuring member includes a plate member disposed on the base member.

7. The distance measuring device according to claim 1, wherein the measuring member includes a slider disposed on the base member.

8. The distance measuring device according to claim 1, wherein the measuring member includes a wheeled platform that is disposed on the base member and is capable of autonomously traveling.

9. A method for measuring a distance, comprising:

measuring, in a reactor in which a plurality of reaction tubes arranged parallel to each other is joined to a tube sheet, a distance from an opening formed at an end of a reaction tube in an axial length direction to a solid in a granular shape of a catalyst and/or an inert substance filled in the reaction tube in a non-contact manner for at least some of the plurality of reaction tubes, wherein a measuring member holding a length measuring instrument on a base member is movably disposed, support legs support the base member and allow the base member to be detachably attached above the tube sheet, wherein the support legs are stretchable, and a height of each of the support legs is adjustable, a straight line parallel to a direction in which the measuring member disposed on a surface of the base member moves is defined as a reference line, an angle formed by a straight line parallel to an axial length direction of the reaction tube and the reference line, which are on an identical plane, is constant for the plurality of reaction tubes disposed side by side along the reference line, by using an adjustment mechanism configured to adjust a measurement direction and an angle of the length measuring instrument, the angle of the length measuring instrument is adjustable so that the measurement direction of the length measuring instrument is adjusted to be parallel to the axial length direction of the reaction tube in a state where the measuring member is disposed on the base member when the axial length direction of the reaction tube is not perpendicular to the surface of the base member, and the distance is sequentially measured by sequentially moving the measuring member from a position where the distance of one of the reaction tubes is measured to a position where the distance of another of the reaction tubes is to be measured.

* * * * *